US009054465B2

(12) United States Patent
Hodges

(10) Patent No.: US 9,054,465 B2
(45) Date of Patent: Jun. 9, 2015

(54) ELECTRICAL COMMUNICATION SWITCH, OUTLET, COMPANION DEVICE, AND SYSTEM

(76) Inventor: Jonas Joel Hodges, Thousand Oaks, CA (US)

( * ) Notice: Subject to any disclaimer, the term of this patent is extended or adjusted under 35 U.S.C. 154(b) by 1712 days.

(21) Appl. No.: 12/106,339

(22) Filed: Apr. 21, 2008

(65) Prior Publication Data

US 2008/0258563 A1 Oct. 23, 2008

Related U.S. Application Data

(60) Provisional application No. 60/913,535, filed on Apr. 23, 2007.

(51) Int. Cl.

| | |
|---|---|
| ***H02B 1/24*** | (2006.01) |
| ***H01R 13/703*** | (2006.01) |
| *H01R 13/652* | (2006.01) |
| *H01R 24/78* | (2011.01) |
| *H01R 25/00* | (2006.01) |
| *H01R 103/00* | (2006.01) |

(52) U.S. Cl.

CPC .......... *H01R 13/7038* (2013.01); *H01R 13/652* (2013.01); *H01R 24/78* (2013.01); *H01R 25/006* (2013.01); *H01R 2103/00* (2013.01)

(58) Field of Classification Search

CPC .................................................... H01R 13/7038
USPC ........................................ 307/40; 340/310.16
See application file for complete search history.

(56) References Cited

U.S. PATENT DOCUMENTS

| | | | | |
|---|---|---|---|---|
| 4,024,528 A * | 5/1977 | Boggs et al. | ............. | 340/310.18 |
| 5,340,954 A * | 8/1994 | Hoffman et al. | ........... | 200/277.2 |
| 5,455,464 A * | 10/1995 | Gosling | .......................... | 307/31 |
| 5,559,406 A * | 9/1996 | Chang | ........................... | 315/322 |
| 5,734,206 A * | 3/1998 | Keizer et al. | .................... | 307/40 |
| 5,895,985 A * | 4/1999 | Fischer | ........................... | 307/40 |
| 5,905,442 A * | 5/1999 | Mosebrook et al. | ........... | 340/3.7 |
| 6,570,493 B1 * | 5/2003 | Rotem | ..................... | 340/310.16 |
| 6,771,182 B1 * | 8/2004 | Loh et al. | ................... | 340/12.28 |
| 7,683,755 B2 * | 3/2010 | Ostrovsky et al. | ............. | 340/3.9 |
| 7,888,823 B2 * | 2/2011 | Den Ridder | .................. | 307/140 |

* cited by examiner

*Primary Examiner* — Fritz M Fleming
(74) *Attorney, Agent, or Firm* — Jonas Joel Hodges

(57) ABSTRACT

An electrical communication switch, an electrical communication outlet, an electrical communication companion device, and an electrical communication system are provided. The electrical communication switch includes a user-controlled switch having a plurality of switch leads and a controller. The controller is coupled to the user-controlled switch. The controller is configured to determine a change of state of the switch, and upon determining the switch has changed state to a new state, to send a signal. The electrical communication outlet includes a socket having a plurality of socket slots, at least one controlled switch, and a controller. The controller is coupled to said at least one controlled switch and is configured to receive a signal and to change a state of at least one of said at least one controlled switch pursuant to the signal.

40 Claims, 31 Drawing Sheets

ELECTRICAL COMMUNICATION SWITCH, OUTLET, COMPANION DEVICE, AND SYSTEM

CROSS-REFERENCE TO RELATED APPLICATION(S)

This application claims priority to and the benefit of U.S. Provisional Patent Application No. 60/913,535, filed on Apr. 23, 2007, in the United States Patent and Trademark Office, the entire content of which is incorporated herein by reference.

BACKGROUND OF THE INVENTION

1. Field of the Invention

The present invention relates generally to an electrical switch and an electrical outlet, and more particularly, to an electrical switch, an electrical outlet, and an electrical companion device that communicate together through an electrical communication system or through wireless transmission in order to carry out particular functions.

2. Description of Related Art

Electrical switches/interrupters and electrical outlets/sockets are generally known in the art. Electrical outlets typically provide AC electric power to home appliances, tools, and other AC power devices. Electrical switches allow for lighting and other fixtures and particular electrical outlets to be turned off and on. Electrical outlets and electrical switches may also be known as electrical wall outlets and electrical wall switches, respectively. FIG. 1*a* depicts a conventional electrical switch 10 and FIG. 1*b* is a circuit diagram of the electrical switch 10. The electrical switch 10 includes switch 11, power lead 12, manual switch lead 13, ground/earth lead 14, and screw holes 15. The ground/earth lead 14 allows the metal casing of the electrical switch 10 to be held at a ground voltage. The screw holes 15 allow a faceplate/cover to be attached for covering the electrical switch leads, the electrical box, and unfinished drywall. Switch 11 is a mechanical switch that opens and closes the connection between power lead 12 and manual switch lead 13. In a closed position, power lead 12 is connected to manual switch lead 13. In an open position, power lead 12 is disconnected from manual switch lead 13. FIG. 1*c* depicts a conventional electrical outlet 20 and FIG. 1*d* is a circuit diagram of the electrical outlet 20. The electrical outlet 20 includes power leads 21, neutral leads 22, ground lead 23, and screw hole 25. The power leads 21, neutral leads 22, and ground lead 23 are connected to female slots 21', 22', and 23', respectively, in the sockets 24 for providing power to AC devices. The ground lead 23 may also be connected to the metal casing of the electrical switch 20 for holding the casing at a ground voltage. For convenience, the electrical switch 10 and electrical outlet 20 are shown with a rectangular body, but the electrical switch 10 and electrical outlet 20 may have variously shaped bodies.

With conventional electrical switches 10 and electrical outlets 20, all electrical outlets 20, lighting fixtures, and other fixtures/devices controlled through the electrical switch 10 must be directly wired to the electrical switch 10. For example, if a contractor or homeowner would like to install new lighting to be controlled by a particular electrical switch 10, the contractor or homeowner must install an electrical wire from the manual switch lead 13 of the electrical switch 10 to the device to be controlled. The labor for installing the wiring could be expensive, especially in remodels in which the electrical switch 10 is located a significant distance away from the device to be controlled.

Accordingly, an electrical switch and an electrical outlet are needed that reduce the required wiring and hence wiring labor costs when remodeling. Further, an electrical switch and an electrical outlet are needed that will facilitate easily changing the electrical switches that control particular electrical outlets without having to run additional wiring.

SUMMARY OF THE INVENTION

In an exemplary embodiment of the present invention, an electrical switch is provided including a user-controlled switch and a controller. The user-controlled switch has a plurality of switch leads. The controller is coupled to the user-controlled switch. The controller is configured to determine a change of state of the user-controlled switch, and upon determining the user-controlled switch has changed state to a new state, to send a signal.

In one embodiment, the signal includes information identifying the electrical switch and the new state.

In one embodiment, the controller is coupled to the plurality of switch leads and is configured to determine the change of state of the user-controlled switch by determining a change in a voltage from a first voltage to a second voltage on at least one of the plurality of switch leads, the information identifying the new state being information identifying the second voltage.

In one embodiment, the controller is configured to determine the change of state of the user-controlled switch by determining a change in switch position from a first position to a second position of the user-controlled switch, the information identifying the new state being information identifying the second position.

In one embodiment, the electrical switch further includes a transceiver coupled to the controller for transmitting the signal; an antenna coupled to the transceiver; a memory coupled to the controller; and a control interface coupled to the controller for allowing a user to turn on and to turn off the transceiver and the controller. The controller is configured to send the signal wirelessly through the transceiver and the antenna to other electrical devices, the signal being an electromagnetic signal.

In one embodiment, the user-controlled switch includes a switch control device for allowing a user to control a state of the user-controlled switch, the antenna being located in the switch control device.

In one embodiment, the user-controlled switch includes a switch control device for allowing a user to control a state of the user-controlled switch, the switch control device being removable from the user-controlled switch such that a faceplate can be installed that entirely covers the electrical switch.

In one embodiment, the controller is coupled to a signal/power line and is configured to send the signal to a central controller via the signal/power line.

In one embodiment, the electrical switch further includes a controlled switch having a controlled switch lead output. The controlled switch is controlled by the controller. The controller is coupled to the controlled switch and is configured to receive a signal and to change a state of the controlled switch pursuant to the received signal. The state of the controlled switch affects a voltage on the controlled switch lead output.

In one embodiment, the electrical switch further includes a neutral lead and a power lead coupled to the controller, the power lead being one of the plurality of switch leads or a separate lead; a ground lead coupled to a body of the electrical switch; and a hole for allowing a faceplate to attach to the body of the electrical switch.

In an exemplary embodiment of the present invention, an electrical wall switch is provided having a body, a user-controlled switch, a controlled switch, a controller, and a neutral lead and a power lead. The user-controlled switch has a plurality of switch leads. The plurality of switch leads are accessible on the body for attaching wires. The user controlled switch has a switch control device for allowing a user to control a state of the user-controlled switch. The switch control device is on a front of the body. The controlled switch has a controlled switch lead output. The controlled switch lead output is accessible on the body for attaching wires. The controller is coupled to the user-controlled switch and to the controlled switch. The neutral lead and the power lead are coupled to the controller. The power lead is one of the plurality of switch leads or a separate lead. The controller is configured to determine a change of state of the user-controlled switch, and upon determining the user-controlled switch has changed state to a new state, to send a first signal. The controller is configured to receive a second signal and to change a state of the controlled switch pursuant to the second signal. The state of the controlled switch affects a voltage on the controlled switch lead output.

In one embodiment, the controller is coupled to a signal/power line. The first signal is a state-change signal and the second signal is an action-order signal. The state-change signal is sent on the signal/power line to a central controller. The action-order signal is sent from the central controller on the signal/power line.

In one embodiment, the controller is coupled to the plurality of switch leads and is configured to determine the change of state of the user-controlled switch by determining a change in a voltage from a first voltage to a second voltage on at least one of the plurality of switch leads; the information identifying the new state being information identifying the second voltage; and/or the controller is configured to determine the change of state of the user-controlled switch by determining a change in switch position from a first position to a second position of the user-controlled switch, the information identifying the new state being information identifying the second position.

In one embodiment, the electrical wall switch further includes a transceiver coupled to the controller for transmitting the first signal and for receiving the second signal; an antenna coupled to the transceiver; a memory coupled to the controller; and a control interface coupled to the controller for allowing a user to turn on and to turn off the transceiver and the controller. The controller is configured to send the first signal wirelessly through the transceiver and the antenna to other electrical devices and to receive the second signal wirelessly through the transceiver and the antenna from other electrical devices. The first signal and the second signal are electromagnetic signals.

In an exemplary embodiment of the present invention, an electrical outlet is provided including a socket having a plurality of socket slots; at least one controlled switch; and a controller coupled to said at least one controlled switch and configured to receive a signal and to change a state of at least one of said at least one controlled switch pursuant to the signal.

In one embodiment, said at least one controlled switch includes a controlled switch coupled to a first of the plurality of socket slots and to a power lead. The controlled switch is controlled by the controller. The controller is coupled to the controlled switch and is configured to change a state of the controlled switch pursuant to the signal. The state of the controlled switch affects a voltage on the plurality of socket slots.

In one embodiment, said at least one controlled switch includes a controlled switch having a controlled switch lead output. The controlled switch is controlled by the controller. The controller is coupled to the controlled switch and is configured to change a state of the controlled switch pursuant to the signal. The state of the controlled switch affects a voltage on the controlled switch lead output.

In one embodiment, said at least one controlled switch includes a first controlled switch and a second controlled switch. The first controlled switch is coupled to a first of the plurality of socket slots and to a power lead. The first controlled switch is controlled by the controller. The second controlled switch has a controlled switch lead output. The second controlled switch is controlled by the controller. The controller is coupled to the first controlled switch and is configured to change a state of the first controlled switch pursuant to the signal. The state of the first controlled switch affects a voltage on the plurality of socket slots. The controller is coupled to the second controlled switch and is configured to change a state of the second controlled switch pursuant to the signal. The state of the second controlled switch affects a voltage on the controlled switch lead output.

In one embodiment, the electrical outlet further includes a transceiver coupled to the controller for receiving the signal; an antenna coupled to the transceiver; a memory coupled to the controller; and a control interface coupled to the controller for allowing a user to turn on and to turn off the transceiver and the controller. The controller is configured to receive the signal wirelessly through the transceiver and the antenna from other electrical devices, the signal being an electromagnetic signal.

In one embodiment, the controller is coupled to a signal/power line and is configured to receive the signal from a central controller via the signal/power line.

In one embodiment, the electrical outlet further includes a neutral lead and a power lead coupled to the controller; a ground lead coupled to a body of the electrical outlet; and a hole for allowing a faceplate to attach to the body of the electrical outlet.

In an exemplary embodiment of the present invention, an electrical wall outlet is provided including a socket, a first controlled switch, a second controlled switch, and a controller. The socket has a plurality of socket slots. The first controlled switch is coupled to a first of the plurality of socket slots and to a power lead. The first controlled switch provides power to an external electrical device plugged into the socket. The second controlled switch has a controlled switch lead output. The controlled switch lead output provides power to a fixture with a fixture power lead coupled to the controlled switch lead output. The controller is coupled to the first controlled switch and the second controlled switch for controlling the first controlled switch and the second controlled switch, respectively. The controller is configured to receive a first action-order signal and to change a state of the first controlled switch pursuant to the first action-order signal. The state of the first controlled switch affects a voltage on the plurality of socket slots. The controller is configured to receive a second action-order signal and to change a state of the second controlled switch pursuant to the second action-order signal. The state of the second controlled switch affects a voltage on the controlled switch lead output.

In one embodiment, the electrical wall outlet further includes a third controlled switch coupled to a second of the plurality of socket slots and to a neutral lead. The controller is coupled to the third controlled switch for controlling the third controlled switch. The controller is configured to change a state of the third controlled switch pursuant to the first action-order signal. The state of the third controlled switch affects a voltage on the plurality of socket slots.

In an exemplary embodiment of the present invention, an electrical companion device for replacing an electrical wall switch is provided. The electrical companion device includes a body, a controlled switch, a controller, and a neutral and a power lead. The controlled switch has a controlled switch lead output. The controlled switch lead output is accessible on the body. The controlled switch lead output provides power to a fixture having a fixture power lead coupled to the controlled switch lead output. The controller is coupled to the controlled switch for controlling a state of the controlled switch. The neutral lead and the power lead are coupled to the controller for providing power to the controller. The neutral lead and the power lead are accessible on the body. The controller is configured to receive a signal and to change a state of the controlled switch pursuant to the received signal. The state of the controlled switch affects a voltage on the controlled switch lead output. The body is adapted to allow a faceplate to attach for entirely covering the electrical companion device.

In an exemplary embodiment of the present invention, an electrical communication system is provided including a first electrical device; a second electrical device; and a central controller coupled to the first electrical device and the second electrical device via signal/power lines. The first electrical device includes a user-controlled switch having a plurality of switch leads; and a first electrical device controller coupled to the user-controlled switch. The first electrical device controller is configured to determine a change of state of the user-controlled switch, and upon determining the user-controlled switch has changed state to a new state, to send a state-change signal on one of the signal/power lines to the central controller. The second electrical device includes a controlled switch; and a second electrical device controller coupled to the controlled switch and configured to receive an action-order signal from the central controller via one of the signal/power lines and to change a state of the controlled switch pursuant to the action-order signal.

In one embodiment, the first electrical device and the second electrical device are decoupled from each such that there is no passive communication path between them.

In one embodiment, the central controller is configured to receive the state-change signal via the signal/power lines; to process the state-change signal to obtain state-change data, the state-change data including information identifying the first electrical device and the new state; to access a database to determine an action order associated with the state-change data, the action order being an order directed to the second electrical device to perform an action; to formulate the action-order signal to include the action order; and to send the action-order signal on one of the signal/power lines coupled to the second electrical device.

In one embodiment, the second electrical device is an electrical outlet and further comprises a socket having a plurality of socket slots; the controlled switch has a controlled switch lead output; and the state of the controlled switch affects a voltage on the controlled switch lead output.

In one embodiment, the second electrical device is an electrical outlet and further comprises a socket having a plurality of socket slots. The plurality of socket slots includes a power lead slot. The controlled switch is coupled between power and the power lead slot for providing power to and removing power from the power lead slot.

In one embodiment, the second electrical device is an electrical switch and further comprises a second user-controlled switch having a second plurality of switch leads; the controlled switch has a controlled switch lead output; and the state of the controlled switch affects a voltage on the controlled switch lead output.

In one embodiment, the first electrical device controller is coupled to the plurality of switch leads and is configured to determine the change of state of the user-controlled switch by determining a change in a voltage from a first voltage to a second voltage on at least one of the plurality of switch leads, the information identifying the new state being information identifying the second voltage; and/or the first electrical device controller is configured to determine the change of state of the user-controlled switch by determining a change in switch position from a first position to a second position of the user-controlled switch, the information identifying the new state being information identifying the second position.

In one embodiment, the electrical communication system further includes a relay coupled between the central controller and the signal/power lines. The relay is configured to receive signals from and to send signals to the first electrical device and the second electrical device. The relay also is configured to communicate with the central controller.

In an exemplary embodiment of the present invention, a method of communication between electrical devices without utilizing any passive communication path between the electrical devices is provided. The electrical devices include a first electrical device and a second electrical device. The method includes determining when a first electrical device changes a state to a new state; sending a first signal upon determining the first electrical device has changed state; and receiving a second signal and performing an action pursuant to the second signal. The action includes one of the following: controlling a socket of the second electrical device to change a voltage; or controlling a lead of the second electrical device to change a voltage.

In one embodiment, the first signal and the second signal are the same. The first signal and the second signal are a wireless electromagnetic signal.

In one embodiment, the method further includes receiving the first signal by a central controller; processing the first signal to obtain state-change data, the state-change date including information identifying the first electrical device and the new state; accessing a central controller database to determine an action order associated with the state-change data; formulating the second signal to include the action order; and sending the action-order signal to the second electrical device.

In an exemplary embodiment of the present invention, a method of controlling a third electrical device with a first electrical device, the third electrical device being provided power by a second electrical device, is provided. The method includes installing the first electrical device. The first electrical device has a user-controlled switch and a first electrical device controller coupled to the user-controlled switch. The first electrical device controller is configured to determine a change of state of the user-controlled switch, and upon determining the user-controlled switch has changed state to a new state, to send a first signal. The method includes installing the second electrical device. The second electrical device has a controlled switch and a second electrical device controller coupled to the controlled switch for controlling the controlled switch. The controlled switch has a controlled switch lead output. The second electrical device controller is configured to receive a second signal and to change a state of the controlled switch lead output pursuant to the second signal. The method includes wiring a power lead of the third electrical device to the controlled switch lead output. The method further includes configuring the first electrical device and the second electrical device to communicate together directly or through a central controller such that when a user changes a state of the first electrical device to a new state, the second electrical device is notified of the new state, and thereafter changes a state of the controlled switch lead output pursuant to the new state.

In one embodiment, the first electrical device and the second electrical device are installed in at least one wall of a housing structure.

In one embodiment, the first signal and the second signal are the same. The first signal and the second signal are an electromagnetic signal. When the first electrical device changes state, the first electrical device sends the electromagnetic signal to the second electrical device, the second electrical device receives the electromagnetic signal, and the second electrical device changes a state of the controlled switch lead output pursuant to the electromagnetic signal.

In one embodiment, when the first electrical device changes state, the first electrical device sends the first signal to the central controller. The central controller receives the first signal, formulates the second signal, and sends the second signal to the second electrical device. The second electrical device changes a state of the controlled switch lead output pursuant to the second signal.

DETAILED DESCRIPTION

Figure 1B:
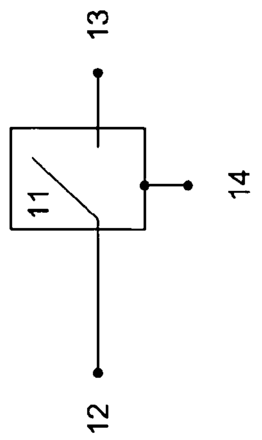
FIG. 1b Prior Art
FIG. 1*b* is a circuit diagram of the electrical switch of FIG. 1*a*.
Figure 1A:
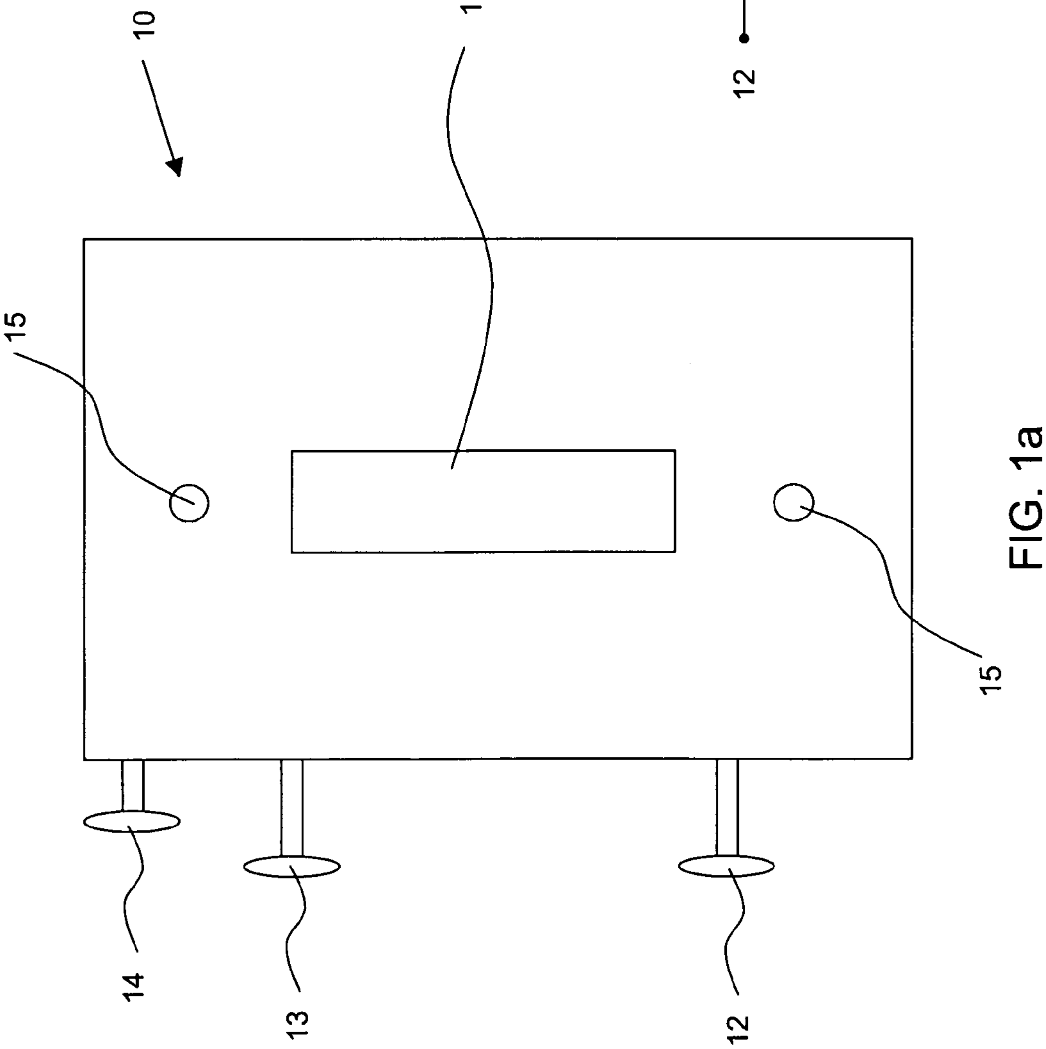
FIG. 1a Prior Art
FIG. 1*a* depicts a conventional electrical switch.
Figure 1D:
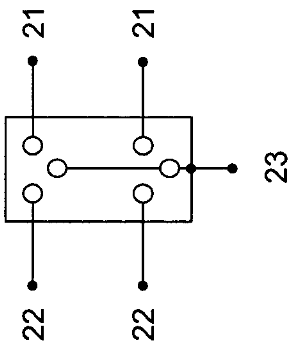
FIG. 1d Prior Art
FIG. 1*d* is a circuit diagram of the electrical outlet of FIG. 1*c*.
Figure 1C:
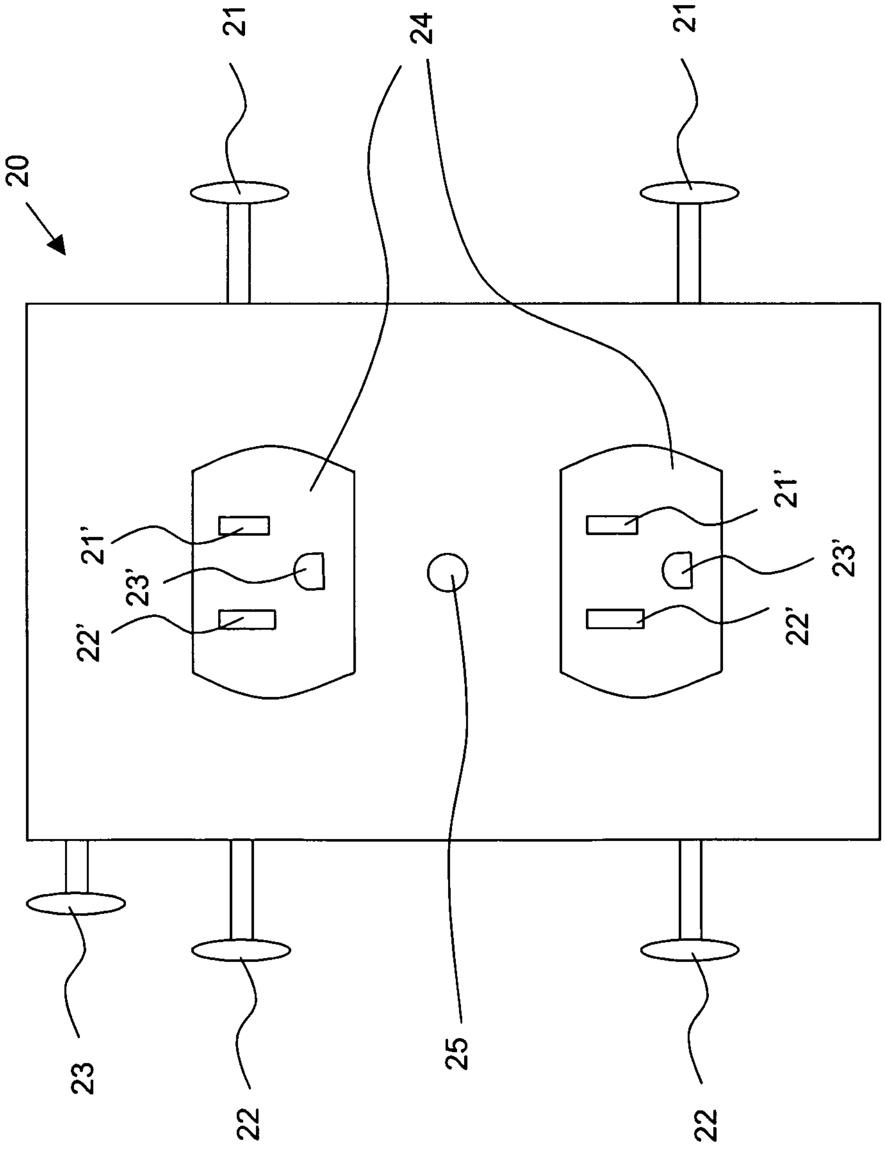
FIG. 1c Prior Art
FIG. 1*c* depicts a conventional electrical outlet.
Figure 2A:
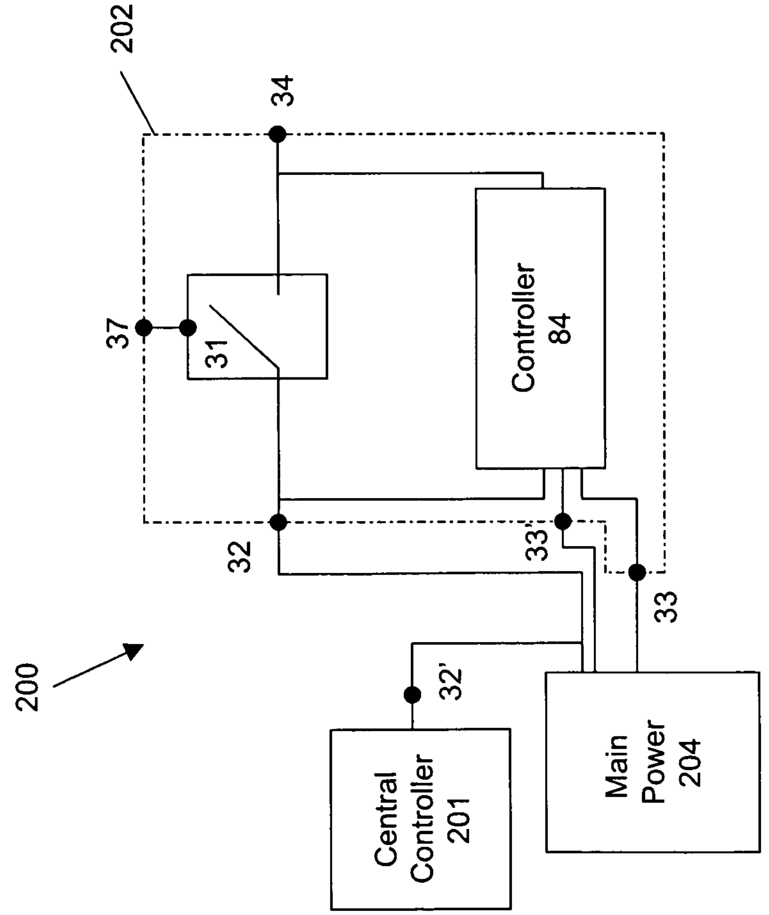
FIG. 2*a* is a circuit block diagram of an electrical communication system including an electrical communication switch according to an exemplary embodiment of the present invention.
Figure 2B:
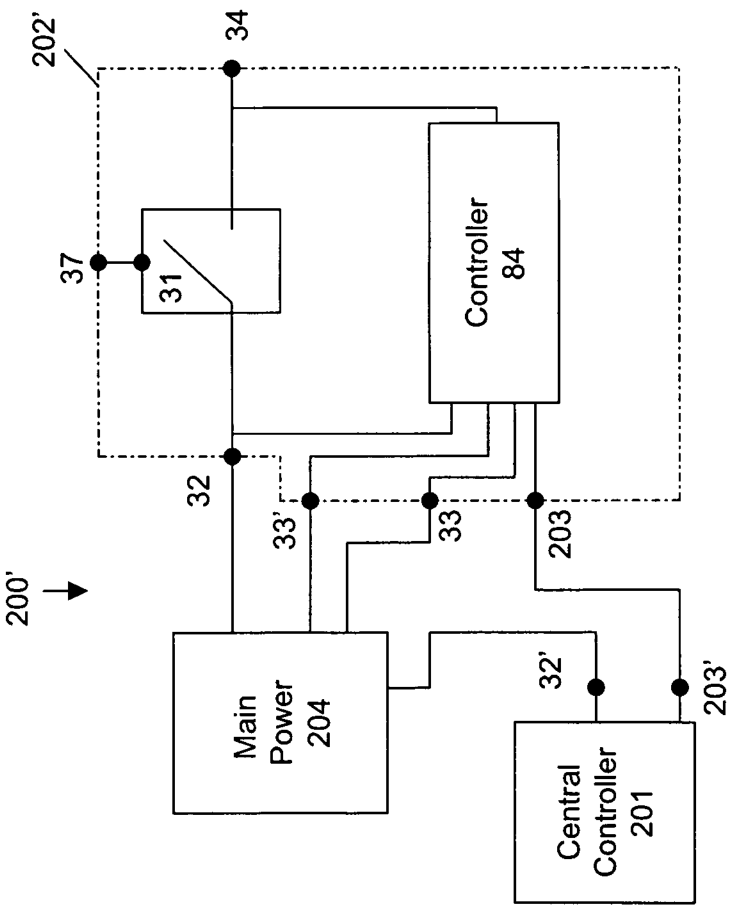
FIG. 2*b* is a circuit block diagram of an electrical communication system including an electrical communication switch according to another exemplary embodiment of the present invention.

FIG. 2*a* and FIG. 2*b* are circuit block diagrams of an electrical communication system including an electrical communication switch 202 according to exemplary embodiments of the present invention. As depicted in FIG. 2*a*, the electrical communication system 200 includes main power 204 (i.e., a power source), central controller 201, and electrical switch 202. Electrical switch 202 includes a controller 84, a switch 31, a power lead 32 coupled to the switch 31 and to the controller 84, a manual switch lead 34 coupled to the other end of the switch 31 and to the controller 84, a ground lead 37 for allowing metal casing of the electrical switch 202 to be grounded, and a neutral lead 33 coupled to the controller 84. Switch 31 may be a mechanical switch; a solenoid switch, which is a specific type of relay that internally uses an electromechanical solenoid to operate an electrical switch; or a transistor switch. Switch 31 is controlled by a user and may be controlled manually or remotely through a remote control device. The ground lead 37 may additionally be coupled to the controller 84. The controller 84 may additionally include a memory. The controller 84 may additionally include its own power lead 33' rather than receive power through power lead 32, which would be necessary in some configurations in which power lead 32 is not coupled to power.

As depicted in FIG. 2*a*, the power lead 32 is coupled to the main power 204 at the main circuit breaker panel in the housing structure. The central controller 201 is coupled to power lead 32 via power lead 32'. The central controller 201 may be located at the main circuit breaker panel in the housing structure. Alternatively, the central controller 201 may be located within the housing structure. The central controller may additionally include a display for allowing homeowners to control the functionality of the electrical switches and electrical outlets from within the housing structure.

An operation of the electrical communication system 200 will now be described. When switch 31 is moved from an open position to a closed position (i.e., the homeowner manually or remotely initiates switch 31 to move from an open position to a closed position), power from power lead 32 is provided to manual switch lead 34. The controller 84 determines when power is provided to manual switch lead 34 and sends a signal on power lead 32 to be received by the central controller 201 via power lead 32'. Alternatively, the controller 84 may determine the state of the switch 31 (e.g., flipped up or flipped down) and send a signal on power lead 32 to be received by the central controller 201 via power lead 32'. Such a signal would be a low voltage signal so as not to interfere with the AC power signal, which in the United States is normally around 120 V. In addition, it may have a higher frequency than the AC power signal, which in the United States is normally at 60 Hz. The signal includes information identifying the particular electrical switch 202, such as a unique identifier, and includes information on the new state (e.g., "on" or "off"). The central controller 201 receives and processes the signal. The central controller 201 then sends another signal on power lead 32' or other connected power leads to be received by other interconnected electrical switches and electrical outlets notifying a particular electrical switch or electrical outlet to perform an action or notifying the electrical switches and electrical outlets that a particular electrical switch has been turned on.

Similarly, when switch 31 is moved from a closed position to an open position, or generally, when switch 31 changes state, the controller 84 sends a signal on power lead 32 to be received by the central controller 201 and the central controller 201 either relays the information or sends particular action orders to other interconnected electrical switches and electrical outlets.

Such an electrical communication system 200 could prove useful in a number of situations. In general, the electrical communication system 200 would allow any outlet or multiple outlets to be controlled by any switch or multiple switches (multi-way), and would allow, for example, a homeowner to change the electrical outlets controlled by a particular switch. For example, assume there is one electrical switch S1 and two electrical outlets O1 and O2 in a room, and that S1 controls O1. If a homeowner would like S1 to control O2 instead of O1, in the current state of the art, the homeowner would have to install wiring between S1 and O2. With the electrical communication system 200, no additional wiring would be needed, as the homeowner could program the central controller 201 to tell O2 to turn off/on upon receiving a signal that S1 has been turned on/off. For another example, the electrical communication system 200 would also allow for an outlet (and interconnected lighting fixtures) to be controlled by multiple switches in a multi-way arrangement without the expense of providing multi-way wiring and multi-way switches.

As discussed in relation to FIG. 2*a*, the controller 84 and the central controller 201 communicate over the electrical wiring supplied to the electrical switches and electrical outlets from the main power 204. The electrical wiring carries an AC power signal, which is normally of around 120 V at 60 Hz in the United States. Alternatively, the controller 84 and central controller 201 may communicate on a designated signal line as depicted in FIG. 2*b*. A plurality of signal lines may be installed along with the electrical wiring in a housing structure and be routed to terminate at the central controller 201. The signal lines may be electrical wiring, fiber optics, or other communication lines for carrying a signal.

Referring to FIG. 2*b*, the electrical communication system 200' includes main power 204, central controller 201, and electrical communication switch 202'. Electrical switch 202' includes a controller 84, a switch 31, a power lead 32 coupled to the switch 31 and to the controller 84, a manual switch lead 34 coupled to the other end of the switch 31 and to the controller 84, a ground lead 37 for allowing metal casing of the electrical switch 202 to be grounded, a signal lead 203 coupled to the controller 84 and to one of the plurality of signal lines in the housing structure, and a neutral lead 33 coupled to the controller 84. The ground lead 37 may additionally be coupled to the controller 84. The controller 84 may additionally have its own power lead 33' rather than receive power through power lead 32. The central controller 201 includes power lead 32', which may or may not be coupled to power lead 32 (i.e., power lead 32' provides power to the central controller 201, but may not provide a signal pathway to power lead 32). The central controller also includes signal lead 203', which is coupled to the signal lines in the housing structure.

In the exemplary embodiment of FIG. 2*b*, the electrical communication system 200' allows for the central controller 201 and interconnected electrical switches and electrical outlets to communicate over a dedicated signal line, which may be faster and more efficient.

Figure 2C:
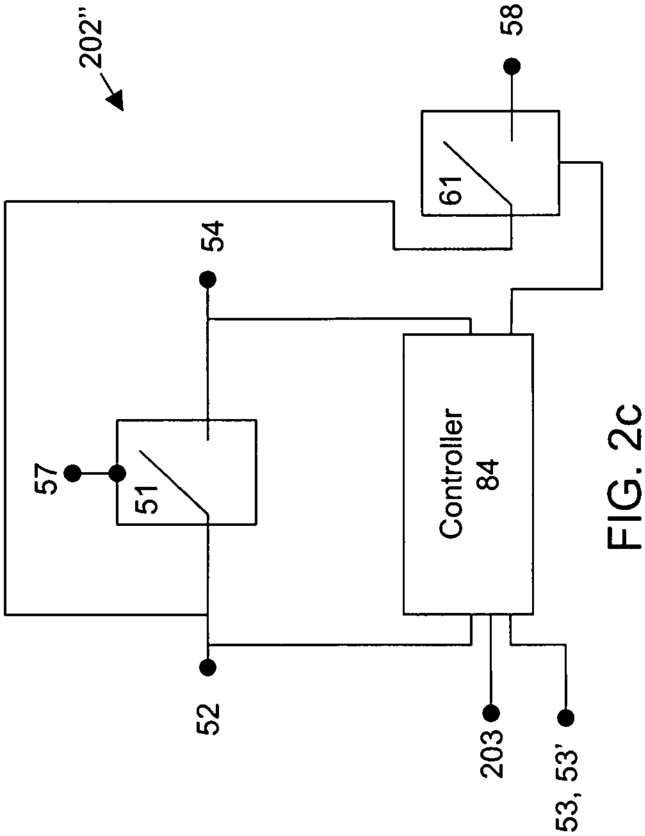
FIG. 2*c* is a circuit block diagram of an electrical communication switch according to another exemplary embodiment of the present invention.
Figure 2D:
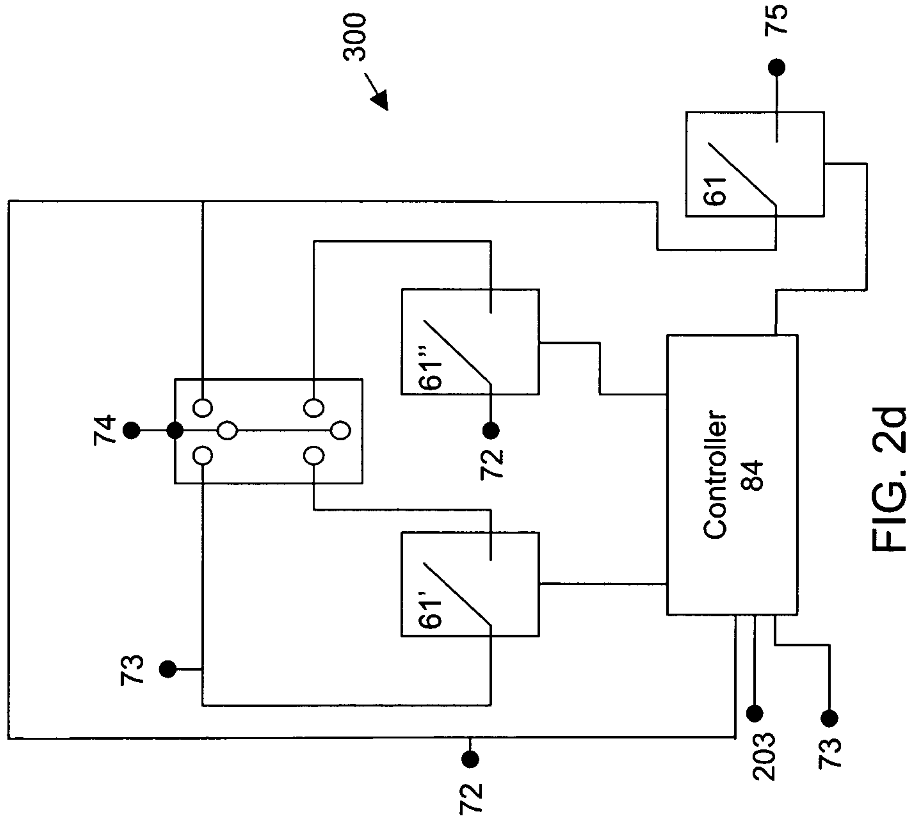
FIG. 2*d* is a circuit block diagram of an electrical communication outlet according to an exemplary embodiment of the present invention.

In the exemplary embodiments of FIG. 2*a* and FIG. 2*b*, the electrical switches 202, 202' send a signal via controller 84 upon the switch 31 changing state. The central controller 201 processes the signal and tells other electrical switches or electrical outlets to perform an action. In the exemplary embodiments of FIG. 2*a* and FIG. 2*b*, the electrical switches 202, 202' are incapable of performing a physical action. FIG. 2*c* provides an exemplary embodiment that is capable of performing a physical action.

FIG. 2*c* is a circuit block diagram of an electrical communication switch 202" according to another exemplary embodiment of the present invention. Electrical switch 202" includes a controller 84, a switch 51, a power lead 52 coupled to the switch 51 and to the controller 84, a manual switch lead 54 coupled to the other end of the switch 51 and to the controller 84, a ground lead 57 for allowing metal casing of the electrical switch 202" to be grounded, a signal lead 203 coupled to the controller 84 and to one of the plurality of signal lines in the housing structure, a neutral lead 53 coupled to the controller 84, controlled switch 61, and controlled switch lead 58. The controller 84 may additionally have its own power lead 53' rather than receive power through power lead 52. The ground lead 57 may additionally be coupled to the controller 84 and/or the controlled switch 61. The controlled switch 61 is a switch that is electronically controlled by controller 84 to change state.

An operation of the electrical switch 202" will now be described. When switch 51 is moved from an open position to a closed position (i.e., the homeowner manually or electronically initiates switch 51 to move from an open position to a closed position), power from power lead 52 is provided to manual switch lead 54. The controller 84 determines when power is provided to manual switch lead 54 and sends a signal on signal line 203 to be received by the central controller. The signal includes identifier information identifying the particular electrical switch 202" and the state of the particular electrical switch 202" (in this case "on" or "off"). The central controller 201 processes the information, determines which electrical switches and/or electrical outlets have been designated (e.g., programmed in the central controller) to respond to a change in state of the electrical switch 202", and sends another signal on the signal line to be received by other interconnected electrical switches and electrical outlets notifying a particular electrical switch or electrical outlet to perform an action.

Similarly, when switch 51 is moved from a closed position to an open position, or generally, when switch 51 changes state, the controller 84 sends a signal on signal lead 203 to be received by the central controller and the central controller sends particular action orders to other interconnected electrical switches and electrical outlets.

If the electrical switch 202" were to receive such an action order request, controller 84 would process the action order and correspondingly control the controlled switch 61 to turn on/off pursuant to the action order. Power from power lead 52 would thus be provided to or removed from the controlled switch lead 58 depending on the request.

Such an electrical switch 202" could prove useful in a number of situations. For example, if a new lighting fixture is installed close to the electrical switch 202", the lighting fixture may be powered through controlled switch lead 58 and controlled by any electrical switch in the housing structure, even an electrical switch located far from the lighting fixture. Such an arrangement would only require additional wiring from the lighting fixture to the electrical switch 202".

FIG. **2*d* is a circuit block diagram of an electrical communication outlet 300 according to an exemplary embodiment of the present invention. The electrical outlet 300 includes a controller 84, a signal lead 203, a power lead 72 coupled to the controller 84 and to one prong of a first socket of the electrical outlet 300, a neutral lead 73 coupled to the controller 84 and to another prong of the first socket of the electrical outlet 300, a first controlled switch 61 controlled by the controller 84 and coupled between the power lead 72 and the controlled switch lead 75, and a second controlled switch 61" controlled by the controller 84 and coupled between the power lead 72 and another prong of the second socket of the electrical outlet 300. When it is desired to control the voltage on the neutral lead (which likely varies from the ground voltage), the electrical outlet 300 may additionally include a third controlled switch 61' controlled by the controller 84 and coupled between the neutral lead 73 and one prong of a second socket of the electrical outlet 300**.

An operation of the electrical outlet 300 will now be described. When controller 84 receives an action order, the controller 84 determines whether the action order applies to turning on/off one of the sockets of the electrical outlet 300 or to turning on/off the controlled switch lead 75. If the action order is a request to turn on one of the sockets, the controller 84 closes controlled switch 61' and controlled switch 61" in order to provide power and neutral to the socket. If the action order is a request to turn off one of the sockets, the controller 84 opens controlled switch 61' and controlled switch 61" in order to remove power and neutral from the socket. If the action order is a request to turn on/off the electrical switch lead 75, the controller opens/closes controlled switch 61 in order to provide power to or to remove power from controlled switch lead 75.

Although the electrical outlet 300 is depicted with controls for both a socket and a controlled switch lead, in alternative embodiments, the electrical outlet 300 may control none to all of the sockets, and may control none to a plurality of controlled switch leads, or any combination thereof. That is, the electrical outlet 300 may include controlled switch 61, but not controlled switches 61', 61" in order to provide functionality for controlling only the controlled switch lead 75. In another exemplary embodiment, the electrical outlet 300 may include controlled switches 61', 61" to control a socket, but not include controlled switch lead 75 and the corresponding controlled switch 61. In yet other exemplary embodiments, the controller 84 can control all the sockets of the electrical outlet 300 and can provide a plurality of controlled switch leads 75 for allowing a plurality of devices to connect and be powered by the electrical outlet 300.

FIG. **2*e* is a block diagram depicting the connection between the central controller/processing unit 201 and the main power 204 according to an exemplary embodiment of the present invention. The electrical switches and electrical outlets 206 are coupled to the electrical wiring and the electrical wiring is coupled to main power 204 at the main circuit breaker panel of the housing structure. The central controller/processing unit 201 is coupled to the electrical wiring in order to receive a signal through the electrical wiring. In an exemplary embodiment, the central controller/processing unit 201 is coupled to relay controller 205 and relay controller 205 is coupled to the electrical wiring. In such an arrangement, relay controller 205 is located at main power 204 at the main circuit breaker panel and requires minimal additional wiring to couple to the electrical wiring. The relay controller 205 processes the signals on the electrical wiring and then sends the information to the central controller/processing unit 201. The relay controller 205 may send the information in digital or analog form to the central controller/processing unit 201. The central controller/processing unit 201** may be located inside the housing structure and provide a convenient control interface for homeowners.

FIG. **2*f* is a block diagram depicting the connection between the central controller/processing unit 201 and the main power 204 according to another exemplary embodiment of the present invention. The electrical switches and electrical outlets 206 are coupled to the electrical wiring and the electrical wiring is coupled to main power 204 at the main circuit breaker panel of the housing structure. The electrical switches and the electrical outlets 206 are also coupled to one or more signal lines. The central controller/processing unit 201 is powered by main power 204** and is coupled to the one or more signal lines in order to receive a signal through the one or more signal lines.

As described in the exemplary embodiments of FIG. 2*a* through FIG. 2*f*, the electrical communication switches and electrical communication outlets communicate through a central controller/processing unit. In an alternative exemplary embodiment, the electrical switches and electrical outlets communicate together directly through transmitting and receiving electromagnetic signals, such as radio frequency (RF) signals.

Figure 2F:
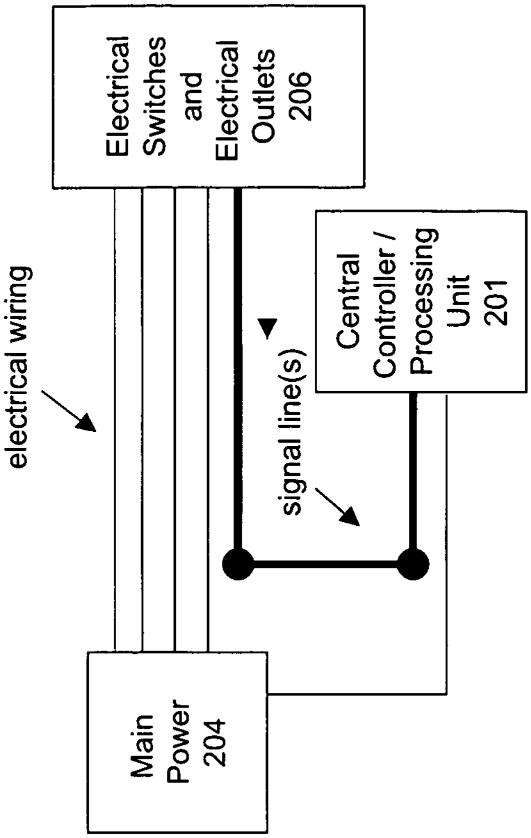
FIG. 2*f* is a block diagram depicting the connection between the controller and the main power according to another exemplary embodiment of the present invention.
Figure 2E:
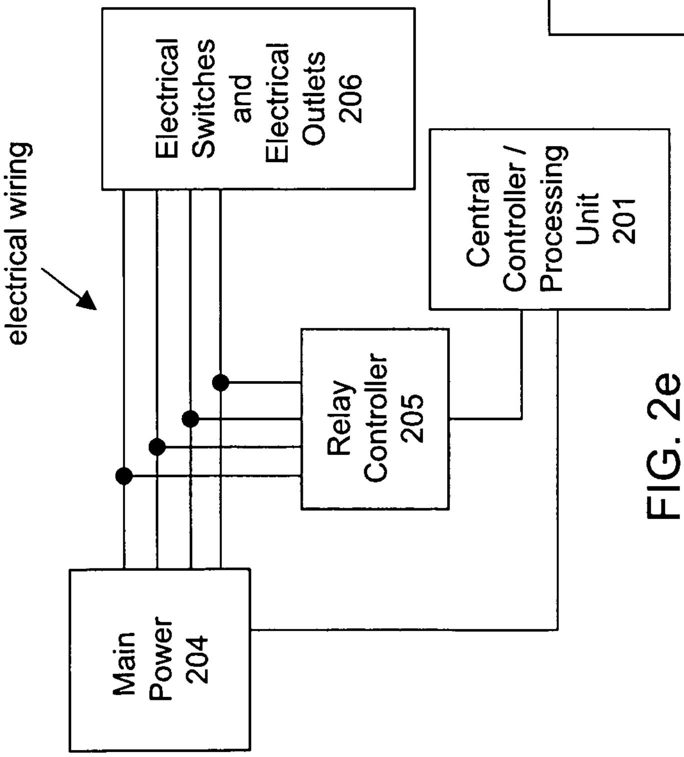
FIG. 2*e* is a block diagram depicting the connection between the controller and the main power according to an exemplary embodiment of the present invention.

The electrical switches, electrical outlets, and electrical companion devices of exemplary embodiments of the present invention are able to communicate together through the sending and receiving of electromagnetic signals or through the sending and receiving of signals via signal/power lines coupled to a central controller. The electrical switches, electrical outlets, and electrical companion devices can communicate together without utilizing any passive communication path between them. That is, the electrical switches, electrical outlets, and electrical companion devices that communicate through a controller can communicate together even through they are coupled to separate signal/power lines as depicted in FIG. 2*e* and FIG. 2*f*, and wireless electrical switches, electrical outlets, and electrical companion devices can communicate together even through they are coupled to separate power lines.

Figure 3A:
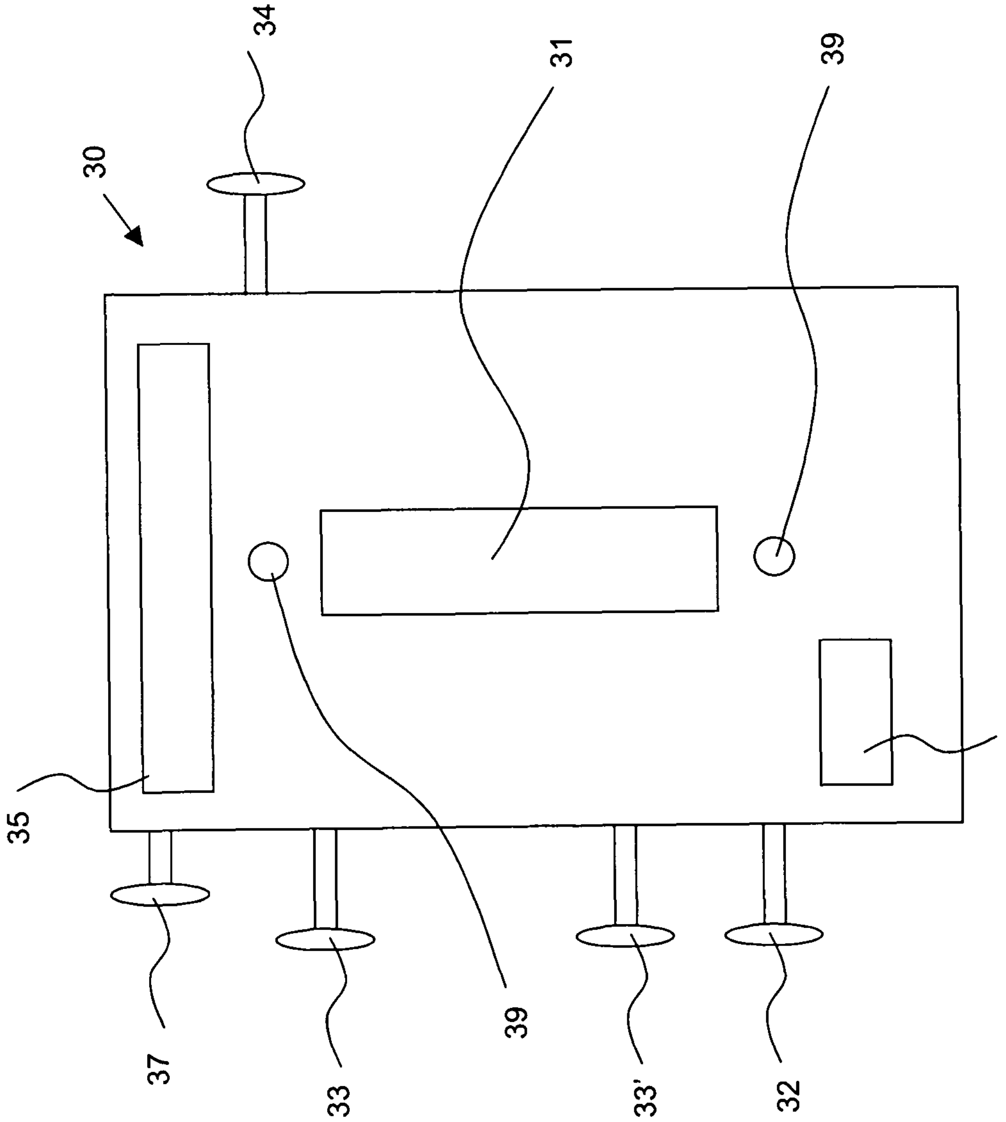
FIG. 3*a* is a front view of an electrical communication switch according to an exemplary embodiment of the present invention.
Figure 3B:
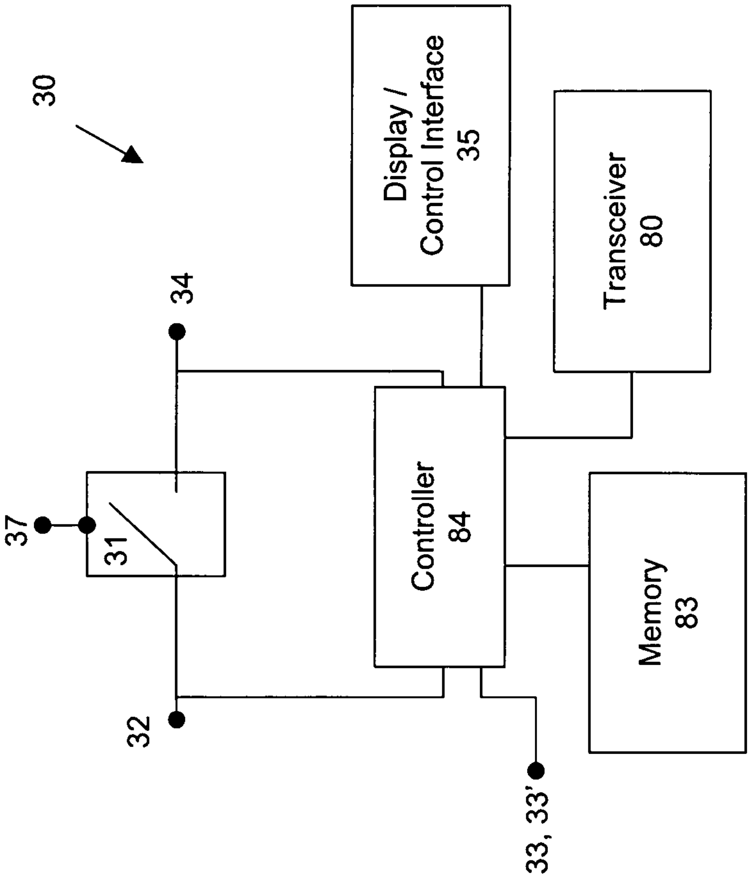
FIG. 3*b* is a circuit block diagram of the electrical communication switch of FIG. 3*a*.

FIG. 3*a* is a view of an electrical communication switch 30 according to another exemplary embodiment of the present invention. FIG. 3*b* is a circuit block diagram of the electrical communication switch 30. The electrical switch 30 includes controller 84, switch 31, power lead 32 coupled to one end of switch 31 and to the controller 84, neutral lead 33 coupled to the controller 84, manual switch lead 34 coupled to the other end of switch 31 and to the controller 84, and screw holes 39 for attaching a faceplate. Alternatively, the electrical switch 30 includes a separate power lead 33' for providing power to the controller 84. The electrical switch 30 additionally includes a memory 83. The electrical switch 30 may also include a display/control interface 35 for turning the communication functionality on and off (i.e., turning on/off the controller 84 and the transceiver 80). The display/control interface 35 may include a display and/or controls for controlling the communication functionality of the electrical switch 30. If the electrical switch 30 communicates wirelessly (i.e., with electromagnetic signals), the control interface 35 handles pairing devices together and the electrical switch 30 includes a transceiver 80. The transceiver antenna 36 may be located in the switch knob of the switch 31, or may be located to coordinate with a transmission window of the faceplate so that the signal is not attenuated. If the electrical switch 30 communicates through a central controller and with a dedicated signal line, the electrical switch 30 includes a signal lead. The electrical switch 30 may additionally include ground lead 37 for allowing metal casing of the electrical switch 30 to be held at a ground voltage. The leads 32, 33, 34, and 37 may extend out from the body or may be internal to the body for allowing a wire to attach.

Unlike the conventional electrical switch 10, the electrical switch 30 includes neutral lead 33 so that the electrical switch 30 is provided with power in order to operate. The screw holes 39 allow a faceplate/cover to be attached for covering the electrical switch leads, the electrical box, and unfinished drywall. An attached faceplate may include transmission glass or some other material adjacent the transceiver antenna 36 such that the cover does not interfere with the transmission and the reception of signals. The control interface 35 allows a user to turn on the components of the electrical switch 30 and allows a user to pair the electrical switch 30 with other electrical switches and electrical outlets for wireless communication.

The control interface 35 allows for turning the communication functionality of the electrical switch 30 on and off. Thus, the control interface 35 may include a switch such as a knob, toggle or dolly, a rocker, a push-button, a dial, or the like, with "on" and "off" settings. For example, if the control interface 35 is implemented with a toggle, a first position will turn the communication functionality on and a second position will turn the communication functionality off. Or, if the control interface 35 is implemented with a push-button, a recessed button position could be an "on" position and a protruding button position could be an "off" position. Or, if the control interface 35 is implemented with a dial, a first setting could be "on" and a second setting with a clockwise or counter-clockwise rotation could be "off." Thus, the control interface 35 may be any means currently known in the art for turning a device on or off.

The control interface 35 may also allow for putting the electrical switch 30 into a pairing mode. Pairing mode allows the electrical switch 30 to be paired with other electrical switches or electrical outlets for wireless communication. Thus, the control interface 35 may include three settings, such as a switch or switches with "off," "on," and "pairing" settings, a button or buttons for allowing three different settings, or a dial with first and second settings for turning the communication functionality of the electrical switch 30 on and off, and a third setting for putting the electrical switch 30 into a pairing mode for wireless communication.

Regardless of the setting of the control interface 35, power provided at power lead 32 may be provided to manual switch lead 34 depending on whether switch 31 is toggled on or off. Thus, the electrical switch 30 may continue to operate in a manual mode, with manual switch lead 34 responding to the toggle position of switch 31.

As discussed above, the control interface 35 allows for turning on/off the communication functionality of the electrical switch 30, and may additionally allow for pairing the electrical switch 30 with other devices for wireless communication. When the communication functionality of the electrical switch is on, the electrical switch 30 may be operated in conjunction with other devices. When the communication functionality of the electrical switch 30 is off, the electrical switch 30 operates in a manual mode as a conventional electrical switch 10. When pairing devices together, the control interface 35 displays "discoverable" electrical switches and electrical outlets in a display screen, provides the ability to scroll through the displayed "discoverable" devices, and provides an ability to select one of the displayed devices for pairing.

A pairing capability is provided by many Bluetooth® wireless technology devices. Bluetooth® is a registered trademark of Bluetooth® SIG, Inc. If Bluetooth® wireless technology is used in the electrical switches and electrical outlets, pairing may be achieved in accordance with Bluetooth® wireless technology standards. Pairing in Bluetooth® enabled devices is typically carried out by making a first Bluetooth® enabled device discoverable. Next, a second Bluetooth® enabled device may discover the discoverable devices. Once the second device finds the first device, the second device displays the first device for selection. A user may then select the device to which the user would like to pair the second device. Once the first device is selected, the second device sends a passkey or PIN to the first device. If the passkey or PIN is correct, the first and second devices are paired together.

With respect to the passkey or PIN, the electrical switch 30 may provide for entering the passkey or PIN through the control interface 35 or the electrical switch 30 may be preprogrammed to provide a particular preset passkey or PIN for pairing with other electrical switches and electrical outlets.

For non-wireless communication devices, the control interface 35 handles turning on/off the non-wireless communication. For wireless communication devices, the control interface 35 also handles pairing devices together. However, if the electrical switches and electrical outlets are preprogrammed for pairing with particular other electrical switches and/or electrical outlets, the control interface 35 may only control turning on/off the wireless communication. In such an embodiment, electrical switches 30 and their paired devices may be provided for sale as a unit together.

At the minimum, the control interface 35 turns the communication functionality of the electrical switch 30 on/off, thus allowing power to be saved when the electrical switch 30 is used manually only (i.e., as a conventional electrical switch). Of course, alternative embodiments may not include the control interface 35, which will leave a homeowner without the ability to turn off the communication functionality of the electrical switch 30.

Switch 31 may be any type of actuator known in the art, including a knob, toggle or dolly, a rocker, a push-button, or any other type of mechanical linkage. In addition, the contacts of the switch 31 may be normally open until closed by operation of the switch 31, may be normally closed until opened by operation of the switch 31, or may contain both types of contacts (e.g., a changeover switch). Also, the switch 31 may be x pole, y throw, with x and y greater than or equal to one. Furthermore, if the switch 31 is a multi-throw switch, it may be make-before-break (i.e., making the new contact before breaking the old contact) or break-before-make (i.e., breaking the old contact before making the new contact). Additionally, the switch 31 may be a biased switch, such as a momentary push-button switch (e.g., push-to-make switch and push-to-break switch).

Figure 4A:
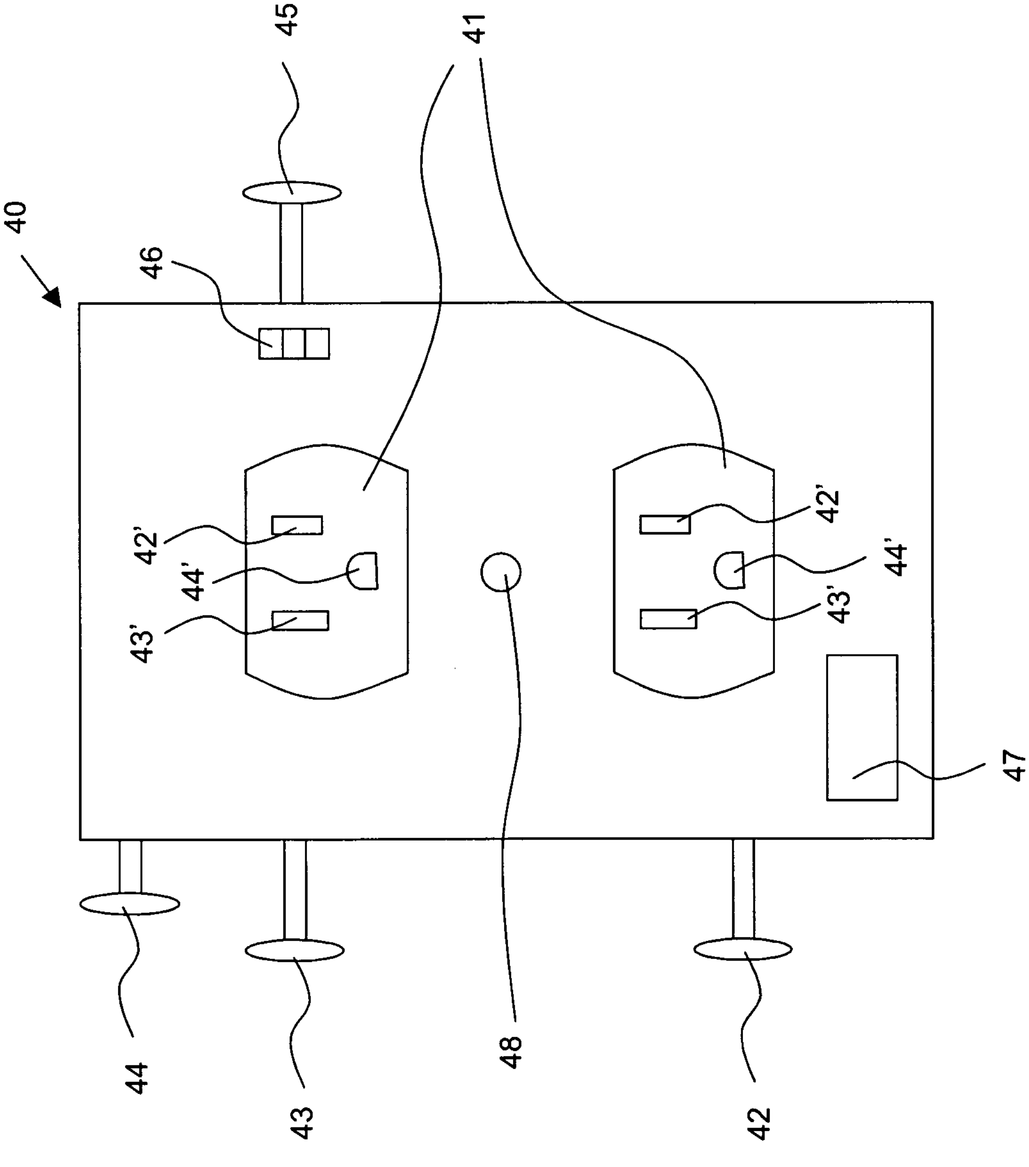
FIG. 4*a* is a view of an electrical communication outlet according to an exemplary embodiment of the present invention.
Figure 4B:
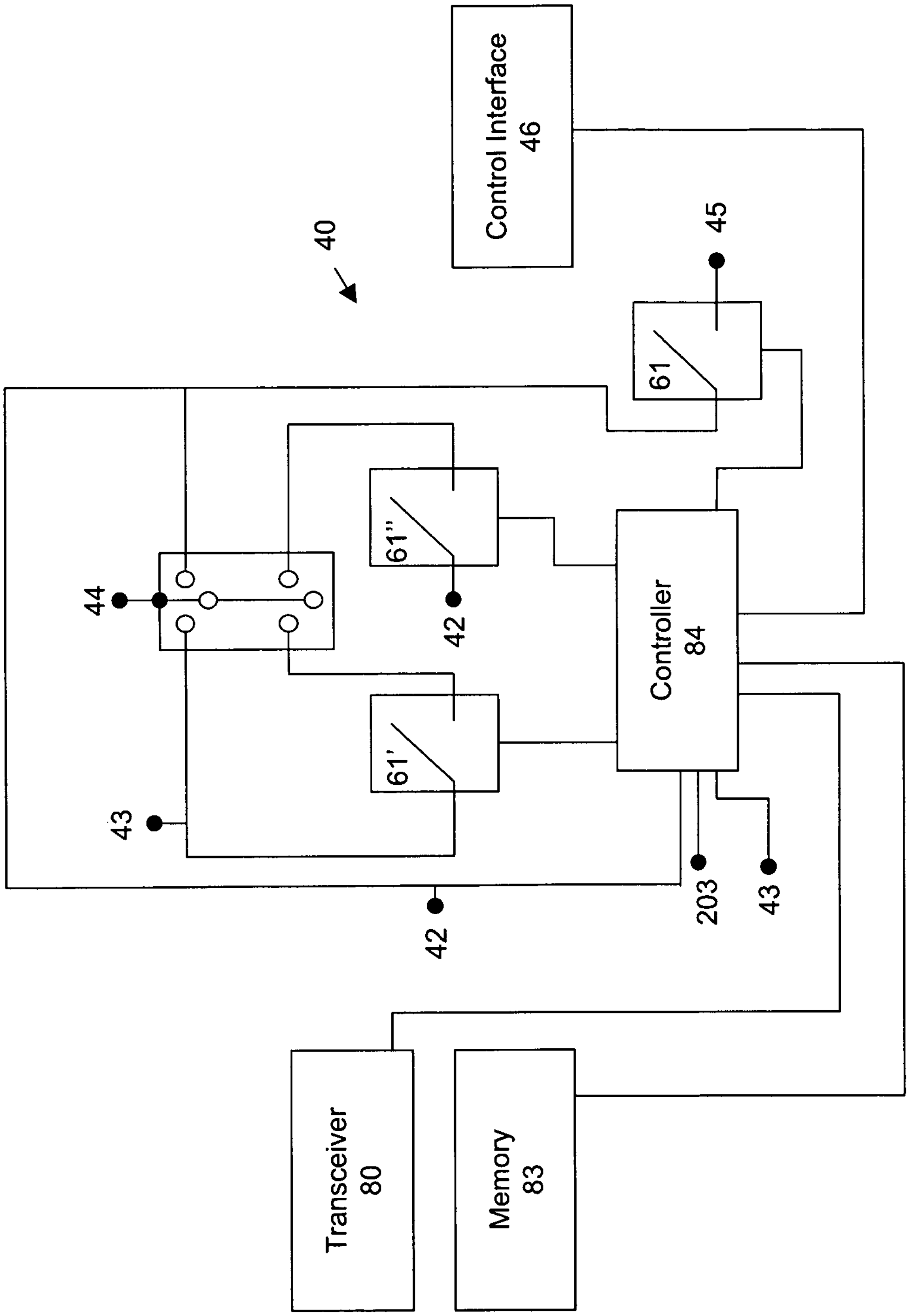
FIG. 4*b* is a circuit block diagram of the electrical communication outlet of FIG. 4*a*.

FIG. 4*a* is a view of an electrical communication outlet 40 according to an exemplary embodiment of the present invention. FIG. 4*b* is a circuit block diagram of the electrical communication outlet 40. The electrical outlet 40 includes electrical sockets 41 for providing AC electrical power to AC powered devices. Power lead 42, neutral lead 43, and ground lead 44 are connected to female socket slots 42', 43', and 44', respectively. Ground lead 44 may also be connected to metal casing of the electrical outlet 40 for holding the casing at a ground voltage. Power lead 42 and neutral lead 43 also provide power to the electrical outlet 40 so that it may operate its communication functionality. The electrical outlet 40 further includes controlled switch lead 45, control interface 46, transceiver 80 with a transceiver antenna 47, memory 83, and screw hole 48. The control interface 46 allows the communication functionality of the electrical outlet 40 to be turned on/off and allows for the electrical outlet to be paired with other devices. The switch 61 is controlled by controller 84 to form a coupling between power lead 42 and controlled switch lead 45. Switches 61', 61" are also controlled by controller 84 to form a coupling between power lead 42 and a female socket slot 42' and to form a coupling between neutral lead 43 and a corresponding female socket slot 43'.

Figure 5:
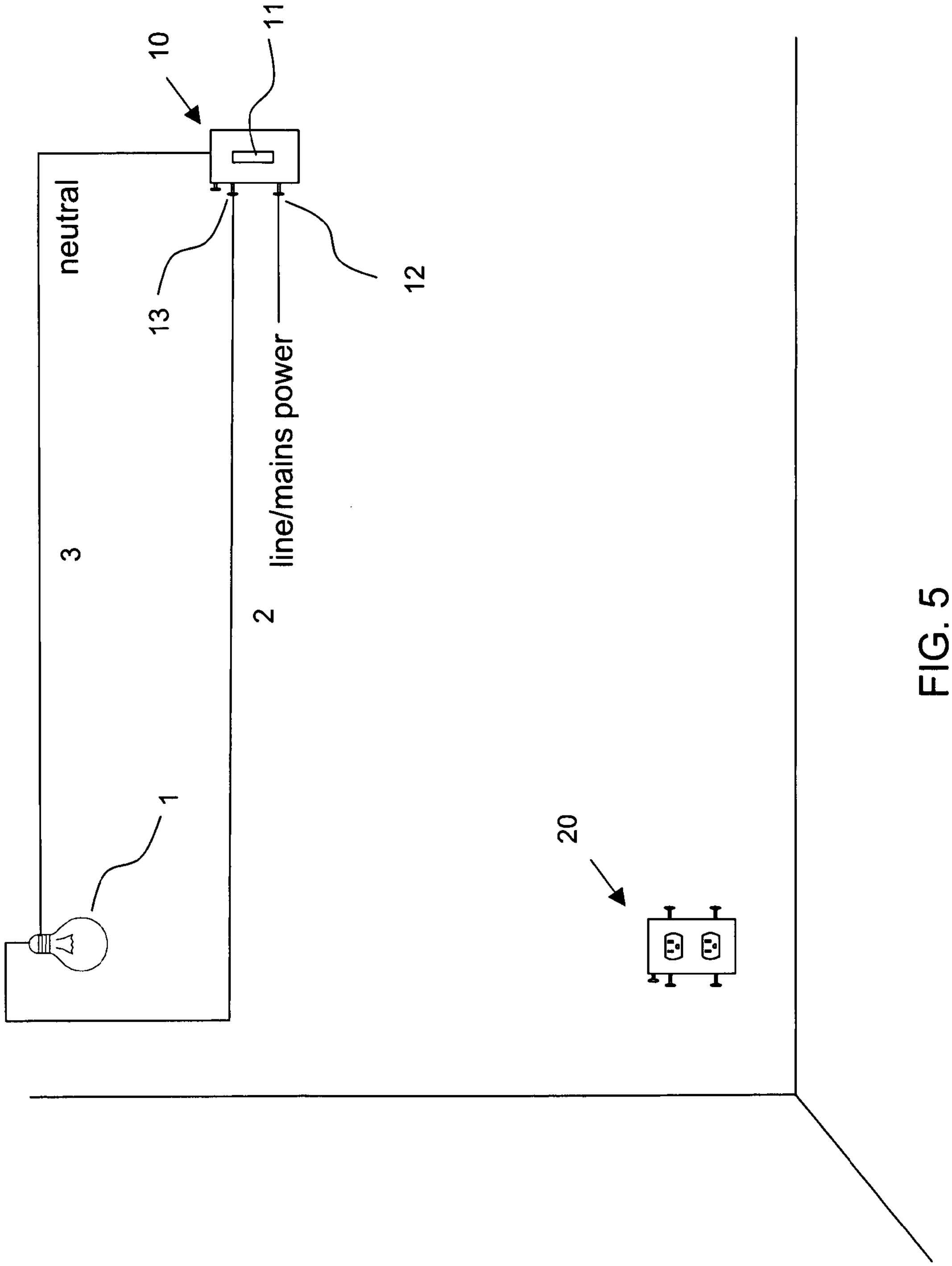
FIG. 5 Prior Art
FIG. 5 is a view showing wiring of a lighting fixture using a conventional electrical switch.

FIG. 5 shows the wiring of a lighting fixture 1 using a conventional electrical switch 10. If a contractor or homeowner would like to install a lighting fixture 1, the contractor or homeowner must install wires 2 and 3 for providing power and neutral, respectively, to the lighting fixture 1 from the conventional electrical switch 10. Power is provided to the conventional electrical switch 10 by connecting the line/mains power wire to power lead 12. Wire 2 is connected to manual switch lead 13. Neutral wire 3 is connected between the lighting fixture 1 and the neutral wire in the box in which the conventional electrical switch 10 is installed. When switch 11 is toggled, power is either provided to manual switch lead 13 or is cut off from manual switch lead 13, thus allowing the lighting fixture to be turned on and off.

Installing wiring 2, 3 is not too difficult if the lighting fixture 1 is close to the conventional electrical switch 10 or if access can be made through an attic. However, if access for the wiring cannot be provided through an attic, the contractor or homeowner must make a series of holes along the wall and ceiling and drill feed holes through studs in order to feed wires 2, 3 to the lighting fixture 1. Labor for installing wires 2, 3 can be expensive due to the labor required for running wires to the lighting fixture 1, patching the holes, texturing the patched holes, and repainting the area.

Figure 6:
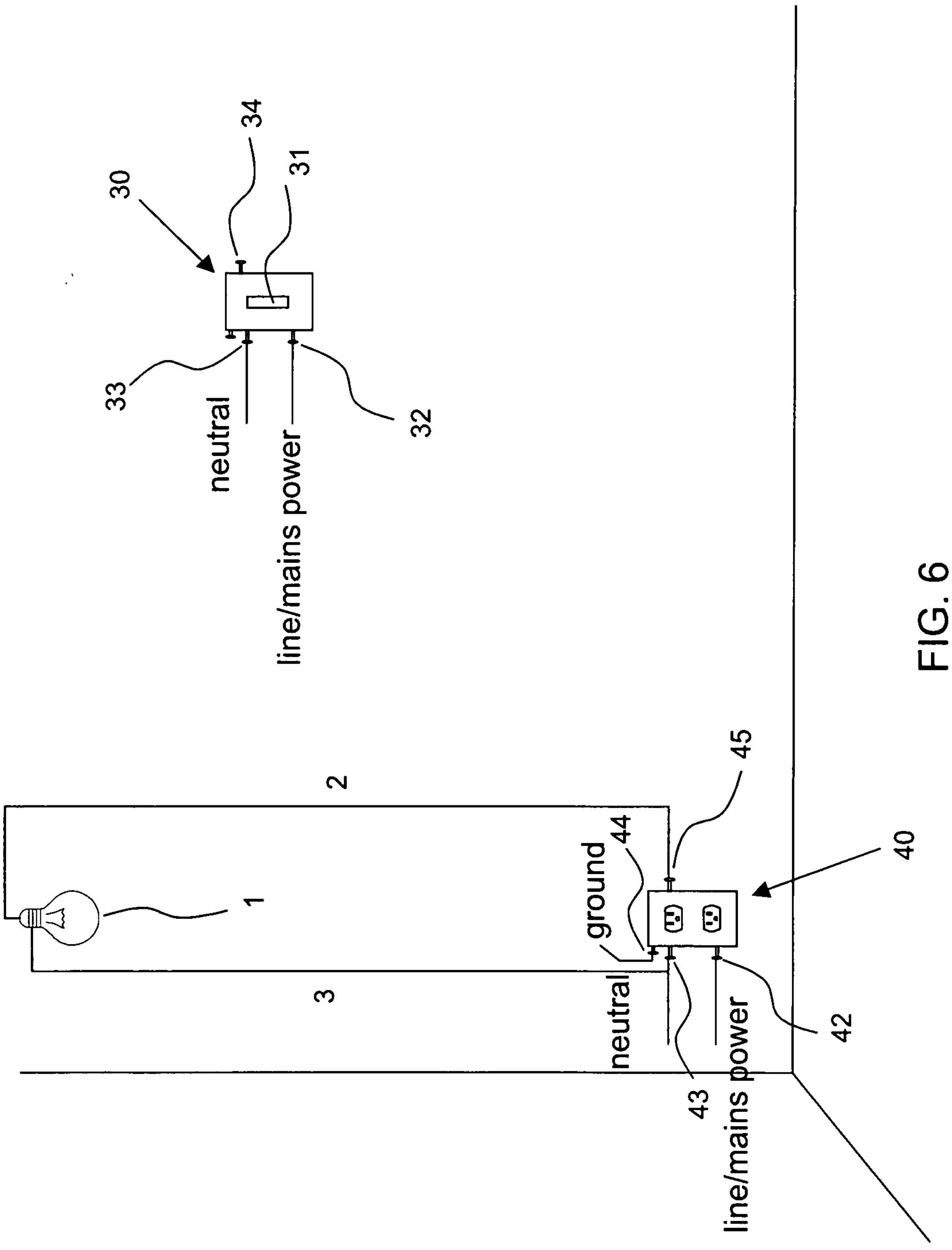
FIG. 6 shows wiring of a lighting fixture using an electrical communication switch and an electrical communication outlet according to an exemplary embodiment of the present invention.

FIG. 6 shows the wiring of a lighting fixture 1 using an electrical communication switch 30 and an electrical communication outlet 40 according to an exemplary embodiment of the present invention. Rather than install wires 2, 3 from the electrical switch 30, which may be located far from the lighting fixture 1, wires 2, 3 may be installed from the closest electrical outlet, but still be controlled from the electrical switch 30. First, conventional electrical switch 10 (see FIG. 5) is replaced with an electrical switch 30. In order to provide power to the electrical switch 30, line/mains power is provided to power lead 32 and neutral is provided to neutral lead 33 of the electrical switch 30. Manual switch lead 34 need not be connected in this particular example. Second, conventional electrical outlet 20 (see FIG. 5) is replaced with an electrical outlet 40. Line/mains power is provided to power lead 42, neutral is provided to neutral lead 43, and ground is provided to ground lead 44. The electrical outlet 40 is powered through the power lead 42 and neutral lead 43. Neutral is also provided to the lighting fixture 1 via neutral wire 3. Power is provided to lighting fixture 1 via wire 2, which is connected to the lighting fixture 1 and the controlled switch lead 45.

If the electrical switch 30 and electrical outlet 40 communicate wirelessly, the electrical switch 30 and electrical outlet 40 must be paired together before the electrical switch 30 and electrical outlet 40 may operate together. If the electrical switch 30 and electrical outlet 40 are implemented with Bluetooth® wireless technology, pairing may be achieved in accordance with Bluetooth® wireless technology standards.

When a homeowner toggles switch 31 of the electrical switch 30, a signal is sent from the electrical switch 30. If the electrical switch 30 and the electrical outlet 40 communicate through a central controller, the central controller sends a corresponding action command to the outlet to control manual switch lead 45 correspondingly. If the electrical switch 30 and the electrical outlet 40 communicate wirelessly, the transceiver 80 of electrical switch 30 sends a signal that is received by the transceiver 80 of the electrical outlet 40. The controller 84 of the electrical outlet 40 then connects or disconnects controlled switch lead 45 from power lead 42.

In order for the electrical switch 30 and electrical outlet 40 to operate properly together in a wireless framework, the transceivers 80 of the electrical switch 30 and the electrical outlet 40 must be able to send/receive signals from a distance at least as great as the distance at which they are installed from each other. If the electrical switch 30 and electrical outlet 40 are implemented with Bluetooth® wireless technology, they may be implemented having an operating range with a device class of a class 1 radio, which currently has a range of 100 meters or 300 feet. Most mobile devices using Bluetooth® wireless technology have an operating range with a device class of a class 2 radio, which currently has a range of 10 meters or 30 feet. A range of 30 feet would be insufficient when paired electrical switches 30 and electrical outlets 40 are located more than 30 feet from each other.

Figure 7A:
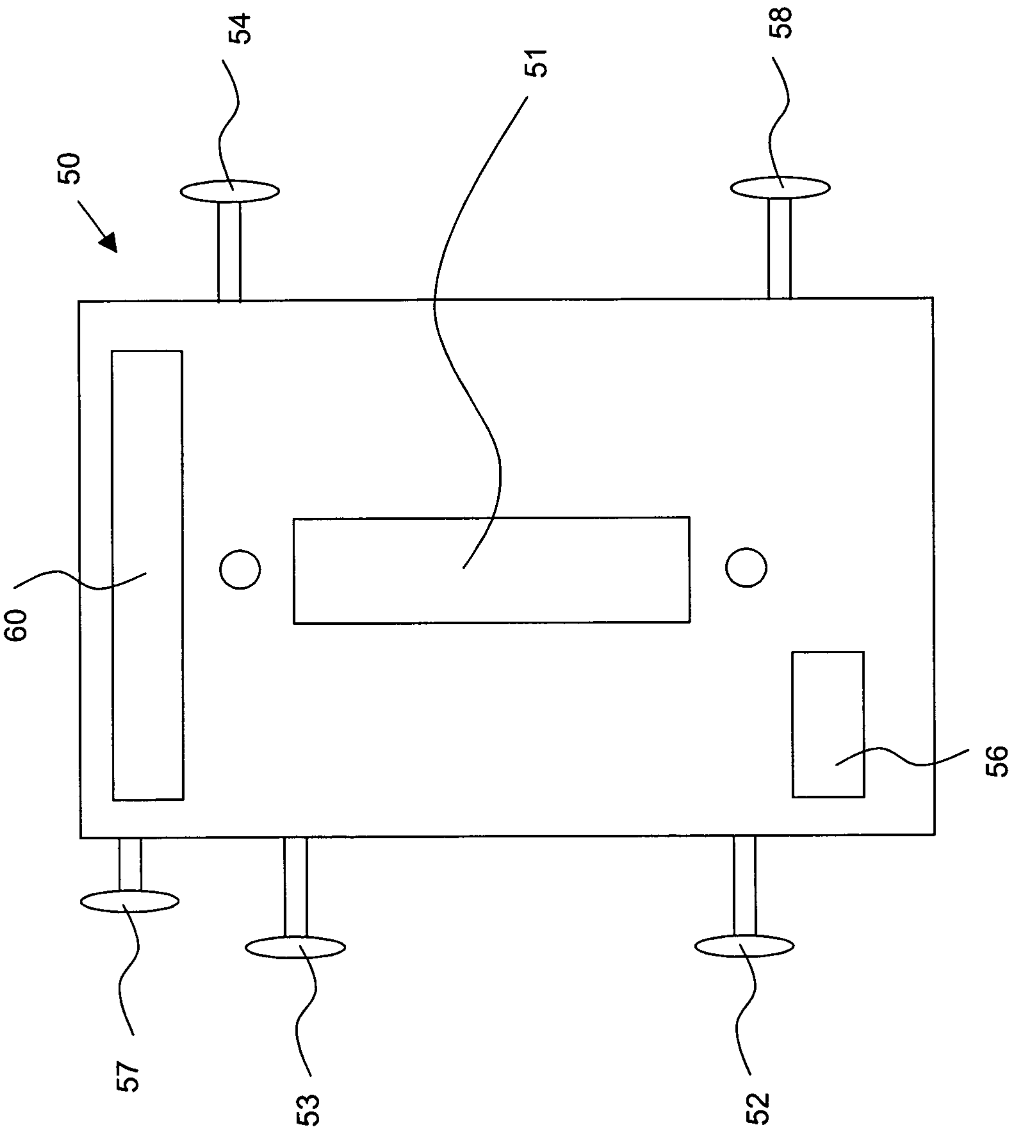
FIG. 7*a* is a view of an electrical communication switch according to another exemplary embodiment of the present invention.
Figure 7B:
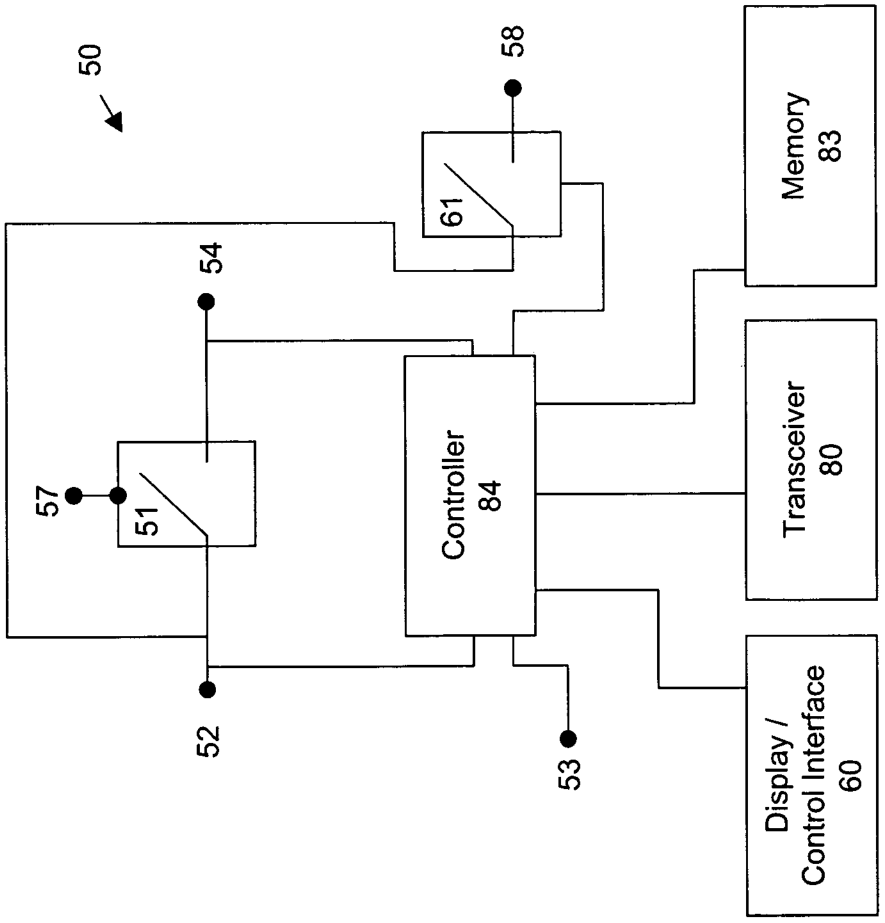
FIG. 7*b* is a circuit block diagram of the electrical communication switch of FIG. 7*a*.

FIG. 7*a* is a view of an electrical communication switch 50 according to another exemplary embodiment of the present invention. FIG. 7*b* is a circuit block diagram of the electrical communication switch 50. The electrical switch 50 includes a controller 84, a switch 51, a switch 61, a control interface 60, a memory 83, a power lead 52, a neutral lead 53, a manual switch lead 54, a ground lead 57, and a controlled switch lead 58. The switch 51 is coupled between the power lead 52 and the manual switch lead 54. The switch 61 is coupled between the power lead 52 and the controlled switch lead 58 and is controlled by controller 84. The power lead 52, neutral lead 53, and the manual switch lead 54 are coupled to the controller 84. If the electrical switch 50 communicates wirelessly, the electrical switch 50 also includes a transceiver 80 and a transceiver antenna 56. The ground lead 57 is connected to metal casing of the electrical switch 50 for holding the casing at a ground voltage.

Figure 8A:
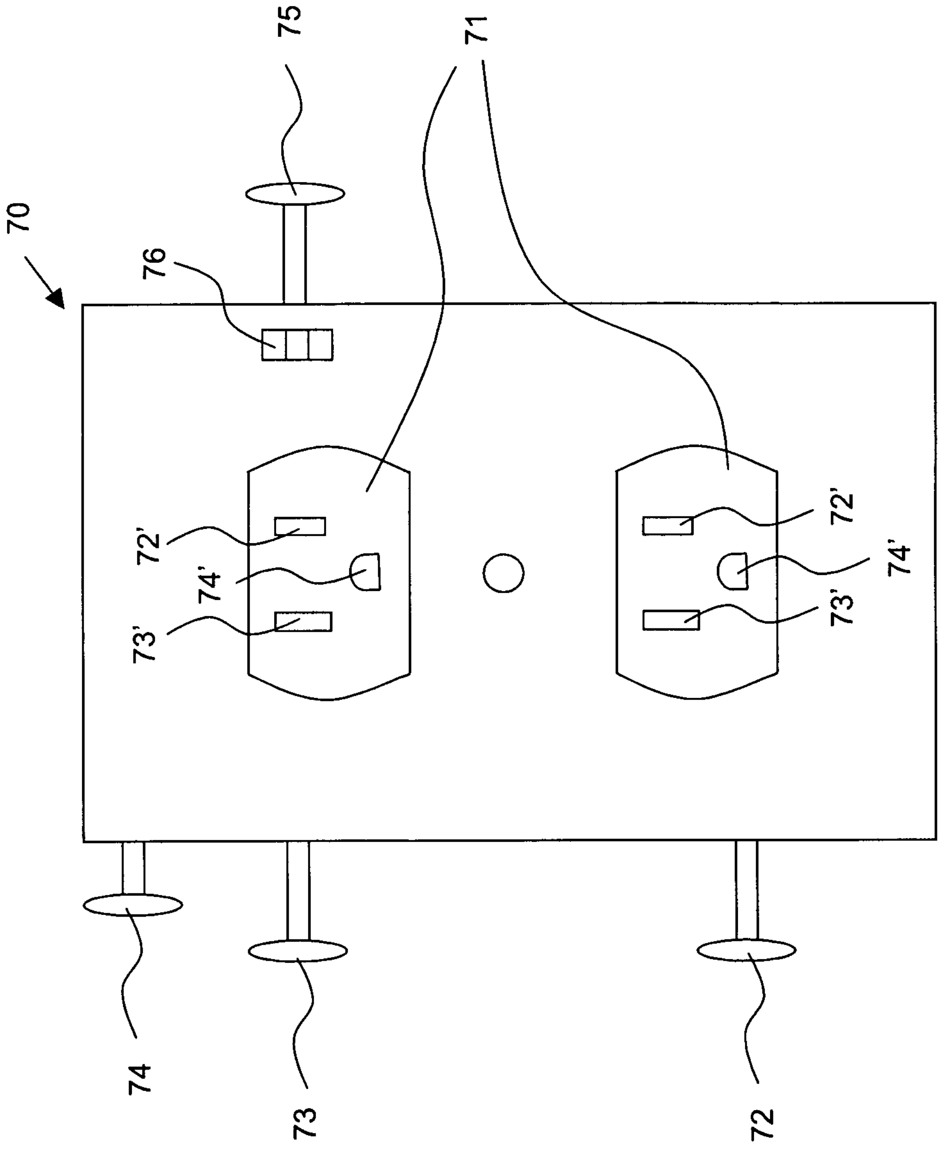
FIG. 8*a* is a view of an electrical communication outlet according to another exemplary embodiment of the present invention.
Figure 8B:
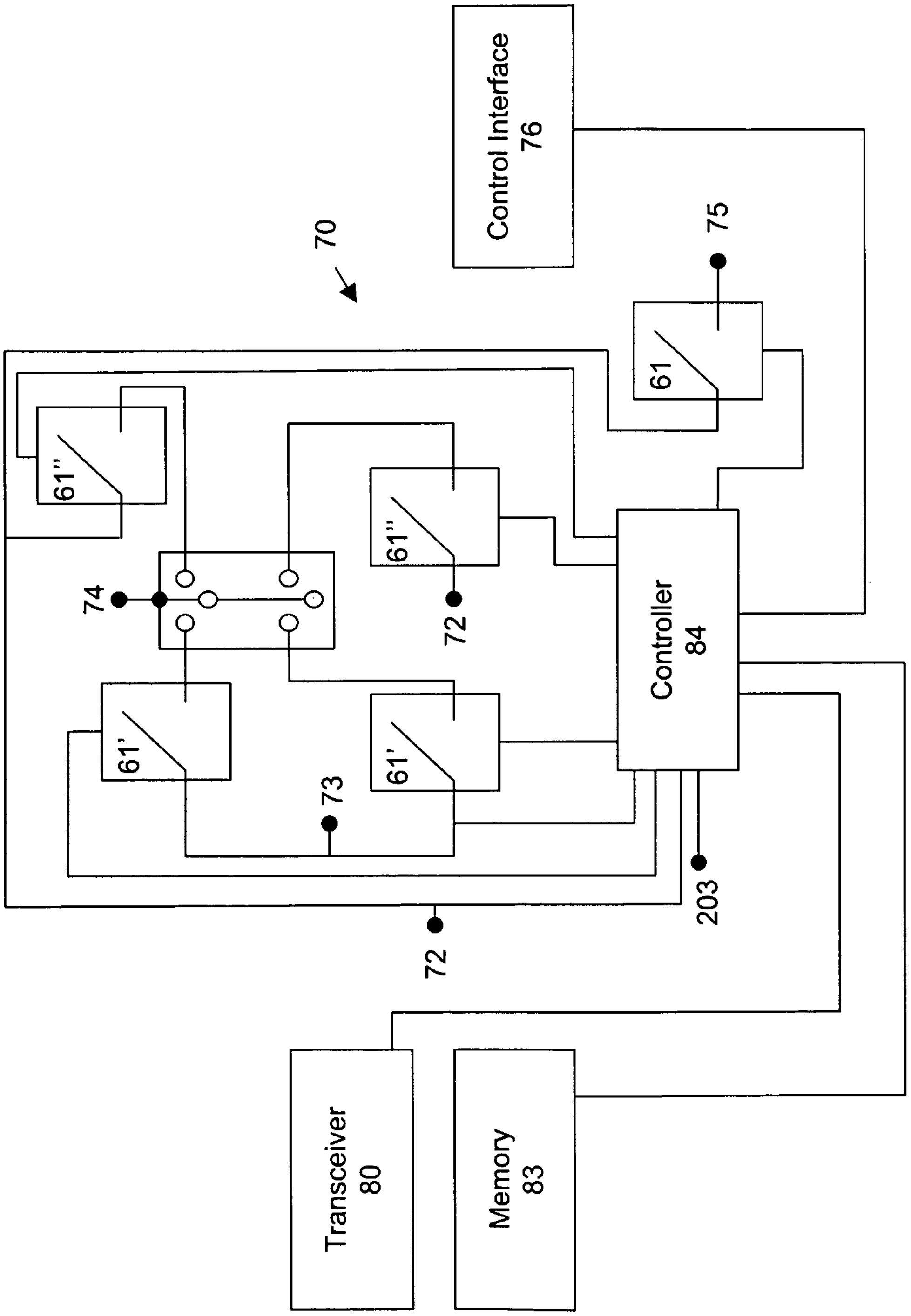
FIG. 8*b* is a circuit block diagram of the electrical communication outlet of FIG. 8*a*.

FIG. 8*a* is a view of an electrical communication outlet 70 according to another exemplary embodiment of the present invention. FIG. 8*b* is a circuit block diagram of the electrical communication outlet 70. The electrical outlet 70 includes sockets 71 for providing AC electrical power to AC powered devices. Power lead 72, neutral lead 73, and ground lead 74 are connected to female socket slots 72', 73', and 74', respectively. Ground lead 74 may also be connected to metal casing of the electrical outlet 70 for holding the casing at a ground voltage. Power lead 72 and neutral lead 73 also provide power to the electrical outlet 70 so that it may operate the controller 84 and other communication components. The electrical outlet 70 further includes controlled switch lead 75 and a control interface 76. For wireless communication, the electrical outlet 70 also includes a transceiver 80. Switches 61, 61', 61" are coupled to the controller 84 for allowing the controller 84 to control when power is provided to sockets 71 and controlled switch lead 75.

Figure 9:
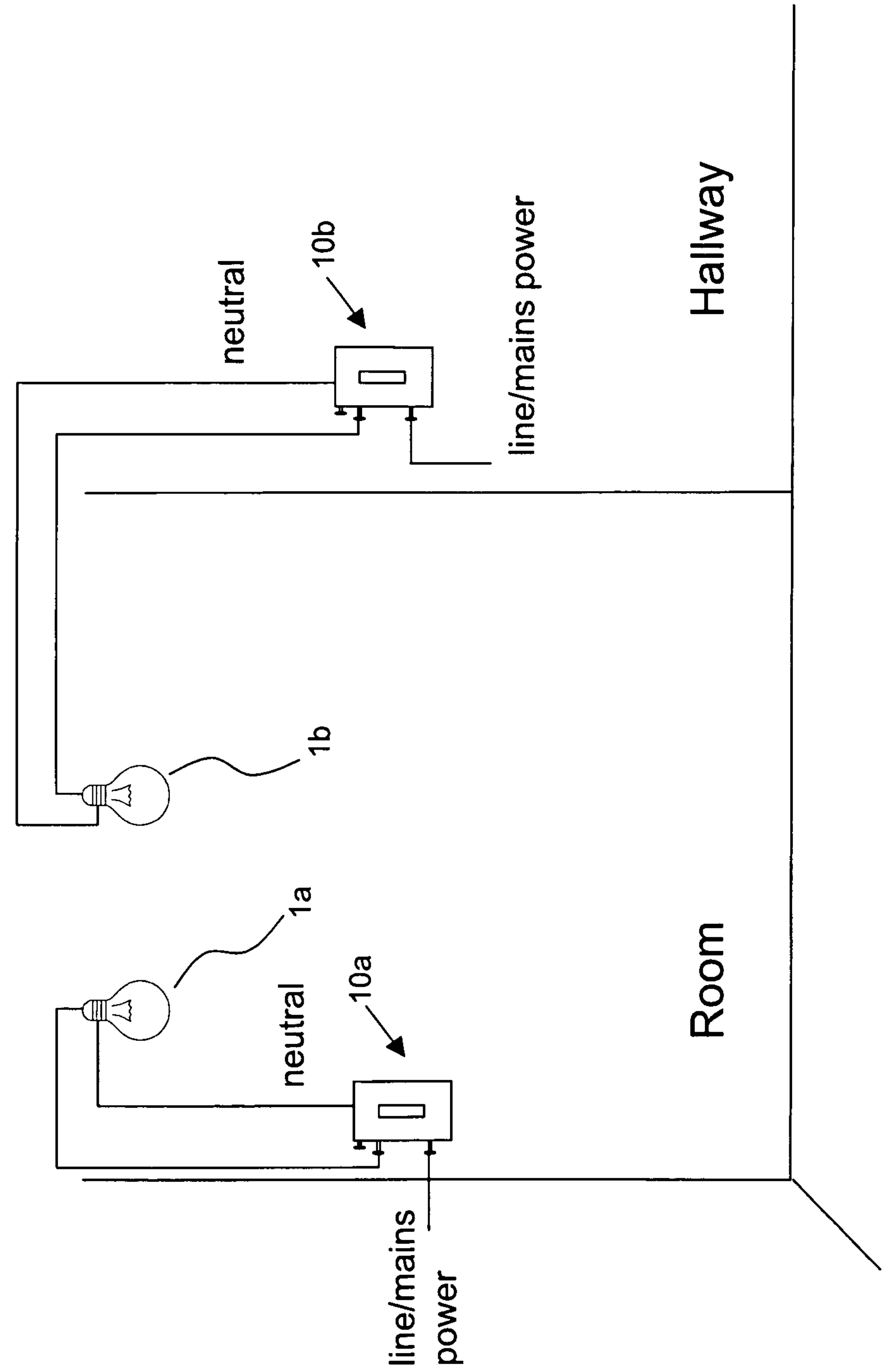
FIG. 9 Prior Art
FIG. 9 is a view showing an exemplary wiring of lighting fixtures in a room using conventional electrical switches.

Wiring examples best demonstrate how the electrical switch 50 and electrical outlet 70 may be used. FIG. 9 is a view showing an exemplary wiring of lighting fixtures 1*a*, 1*b* in a room using conventional electrical switches 10*a*, 10*b*. As depicted in FIG. 9, assume a room has two lighting fixtures 1*a*, 1*b*, and that lighting fixture 1*a* is controlled by a conventional electrical switch 10*a* from within the room and lighting fixture 1*b* is controlled by a conventional electrical switch 10*b* from outside the room, such as a hallway. Using conventional means, if a homeowner would like to control both lighting fixtures 1*a*, 1*b* from within the room at conventional electrical switch 10*a*, lighting fixture 1*b* must be rewired as shown in FIG. 10.

Figure 10:
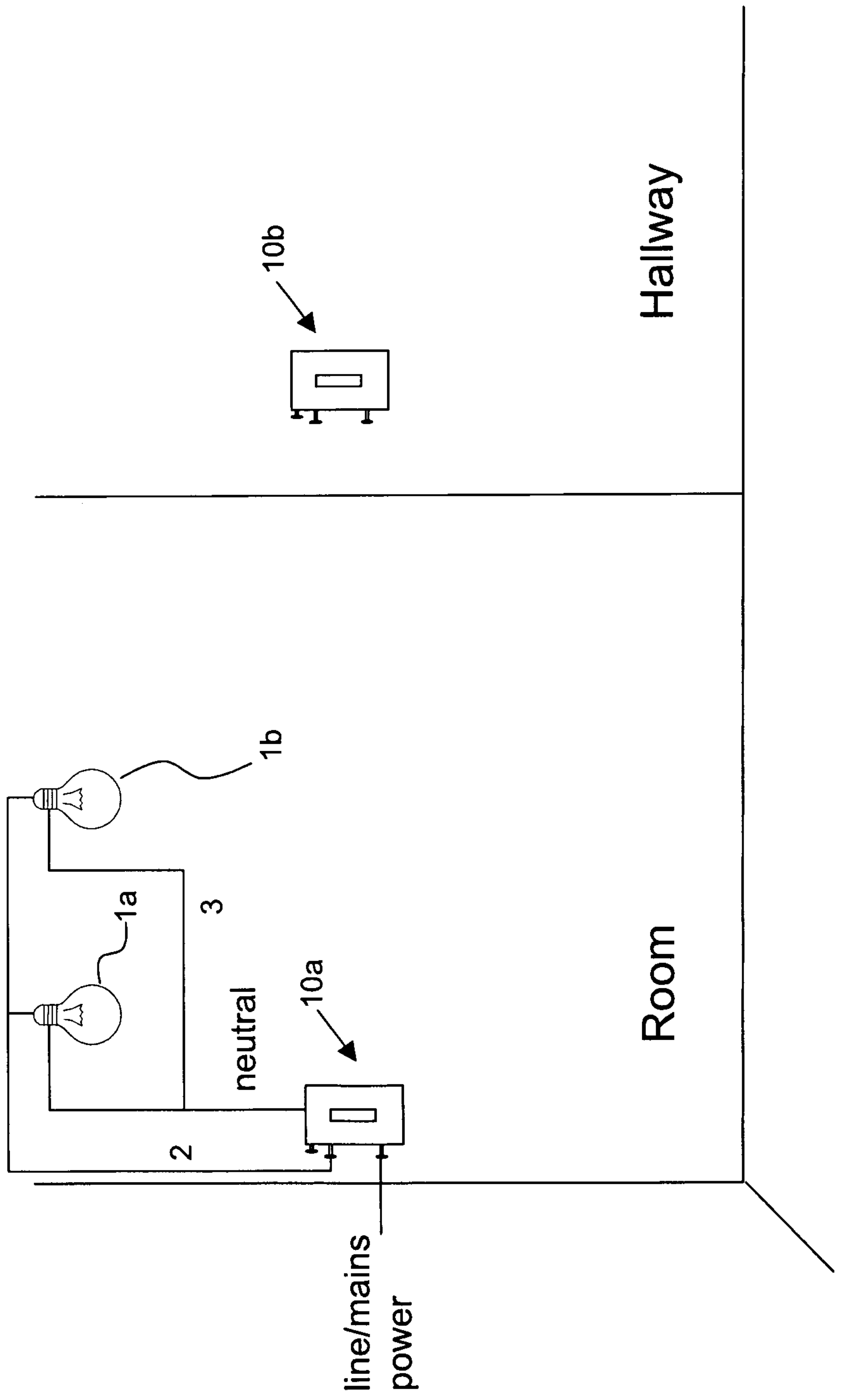
FIG. 10 Prior Art
FIG. 10 is a view showing how the exemplary wiring of lighting fixtures in the room depicted in FIG. 9 must be rewired using conventional electrical switches in order to control the lighting fixtures from one conventional electrical switch.

FIG. 10 is a view showing how the exemplary wiring of lighting fixtures 1*a*, 1*b* in the room depicted in FIG. 9 must be rewired using conventional electrical switches in order to control the lighting fixtures 1*a*, 1*b* from one conventional electrical switch 10*a*. First, wiring to the conventional electrical switch 10*b* is disconnected from the leads of the conventional electrical switch 10*b* and capped off. The wiring may be left in the wall. Second, power lead 2 and neutral lead 3 must be wired from the conventional electrical switch 10*a* to the lighting fixture 1*b*. Thus, if an attic is not accessible, a series of holes must be made in the wall and ceiling in order to feed the wires to the lighting fixture 1*b*.

Figure 11:
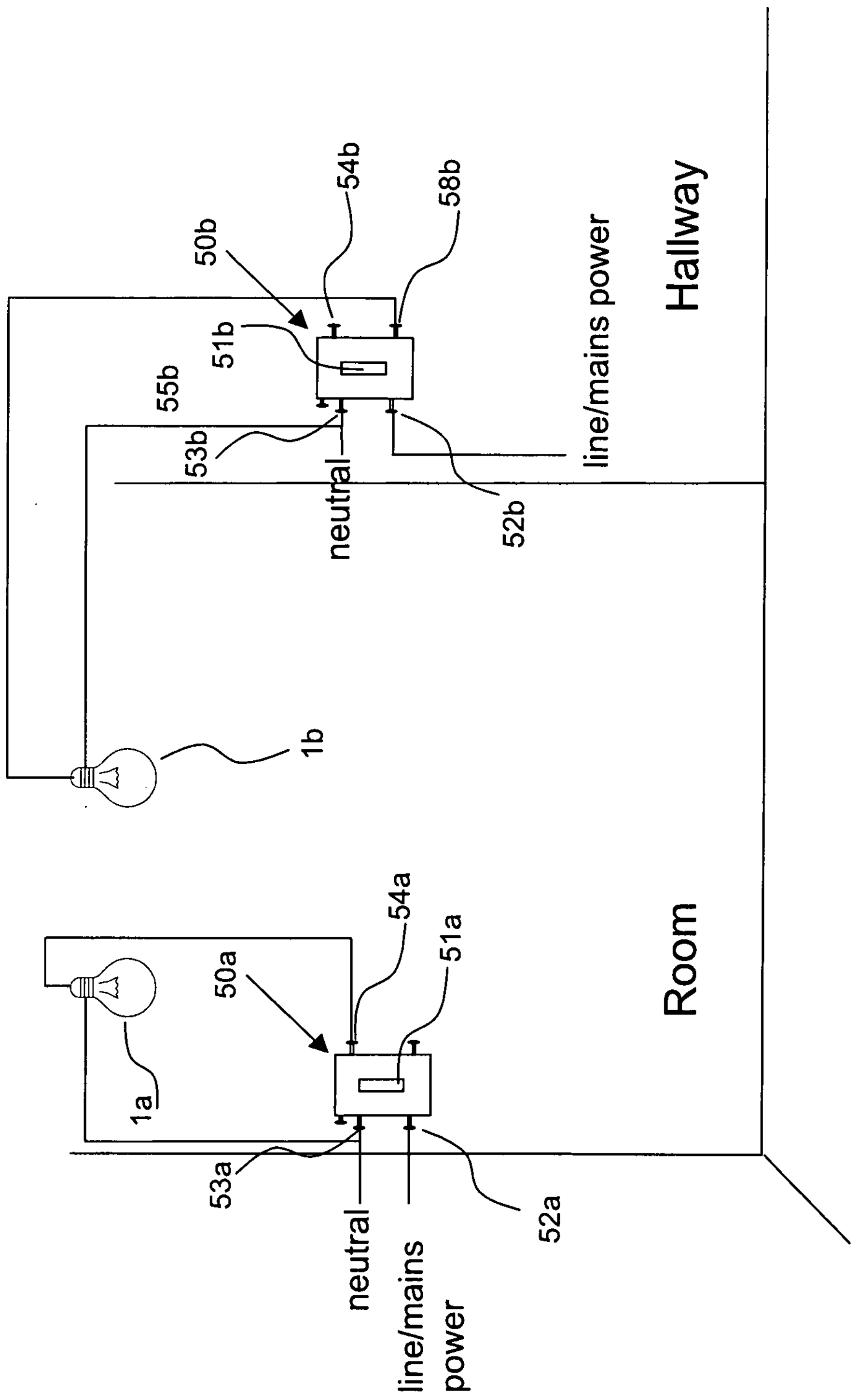
FIG. 11 is a view showing how the exemplary wiring of lighting fixtures in the room depicted in FIG. 9 may be rewired using electrical communication switches in order to control the lighting fixtures from one electrical communication switch.

FIG. 11 is a view showing how the exemplary wiring of lighting fixtures 1*a*, 1*b* in the room depicted in FIG. 9 may be rewired using electrical switches 50*a*, 50*b* in order to control the lighting fixtures 1*a*, 1*b* from one electrical switch 50*a*. In this example, no new wiring need be placed in the walls between electrical switch 50*a* and lighting fixture 1*b*. First, conventional electrical switch 10*b* is replaced with electrical switch 50*b*. Neutral from the lighting fixture 1*b* is connected to neutral in the box and neutral lead 53*b* of the electrical switch 50*b*. Line/mains power is connected to the power lead 52*b* of the electrical switch 50*b*. Power to the lighting fixture 1*b* is connected to the controlled switch lead 58*b* of the electrical switch 50*b*. Second, conventional electrical switch 10*a* is replaced with electrical switch 50*a*. Neutral from the lighting fixture 1*a* is connected to neutral in the box and neutral lead 53*a* of the electrical switch 50*a*. Line/mains power is connected to the power lead 52*a* of the electrical switch 50*a*. Power to the lighting fixture 1*a* is connected to the manual switch lead 54*a* of the electrical switch 50*a*. Lastly, if the electrical switches 50*a*, 50*b* operate through wireless communication, the devices are paired together; and if the electrical switches 50*a*, 50*b* operate through a central controller, the central controller is instructed to send a signal to electrical switch 50*b* notifying electrical switch 50*b* to provide power to or remove power from controlled switch lead 58*b* when the central control receives a signal indicating that switch 51*a* was toggled.

When switch 51*a* of electrical switch 50*a* is toggled "on," power from lead 52*a* is provided to manual switch lead 54*a*, which turns on lighting fixture 1*a*. In addition, a signal is sent with information that switch 51*a* has been toggled on. The electrical switch 50*b* receives the signal directly or receives a corresponding signal from the central controller, and the electrical switch 50*b* connects line/mains power lead 52*b* to controlled switch lead 58*b*, which then turns on lighting fixture 1*b*. Conversely, when switch 51*a* of electrical switch 50*a* is toggled "off," power from lead 52*a* is removed from manual switch lead 54*a*, which turns off lighting fixture 1*a*. In addition, a signal is sent with information that switch 51*a* has been toggled off. The electrical switch 50*b* receives the signal directly or receives a corresponding signal from the central controller, and the electrical switch 50*b* disconnects line/mains power lead 52*b* from controlled switch lead 58*b*, which then turns off lighting fixture 1*b*.

The lighting fixture 1*b* does not respond to toggling of switch 51*b* of the electrical switch 50*b* because switch lead 54*b* is not connected to the lighting fixture 1*b*, and because controlled switch lead 58*b* is not programmed to turn on upon the toggling of switch 51*b*. (In such an arrangement, a central controller is not needed when the controller of the electrical switch 50*b* is instructed to control the controlled switch lead 58*b* depending on the position of its own switch 51*b*.)

The wiring examples of FIG. 9, FIG. 10, and FIG. 11 demonstrate that in some situations use of the electrical communication switches in place of conventional electrical switches may completely avoid having to run wiring inside the walls or ceiling.

Figure 12:
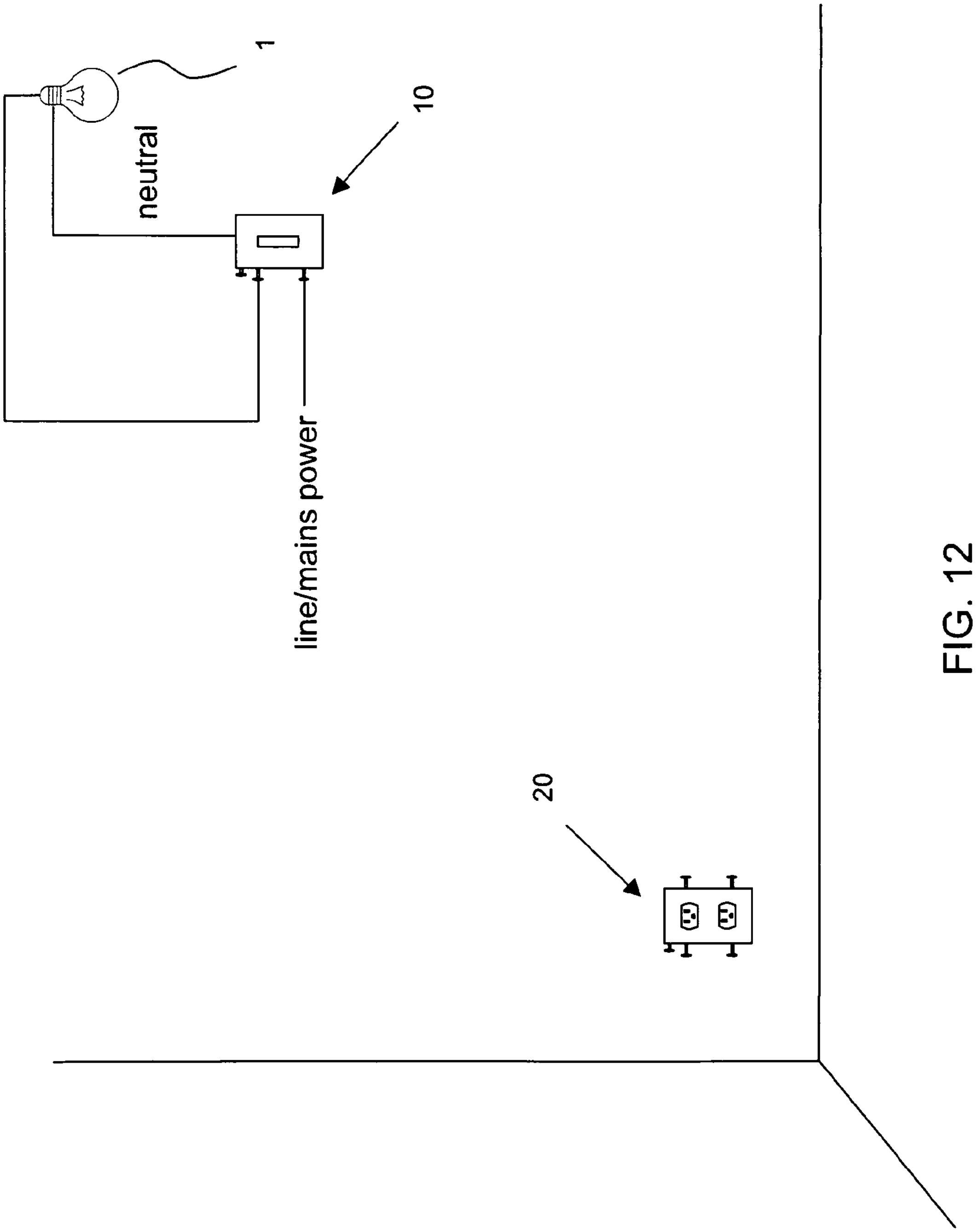
FIG. 12 Prior Art
FIG. 12 is a view showing an exemplary wiring with a conventional electrical switch and conventional electrical outlet.
Figure 13:
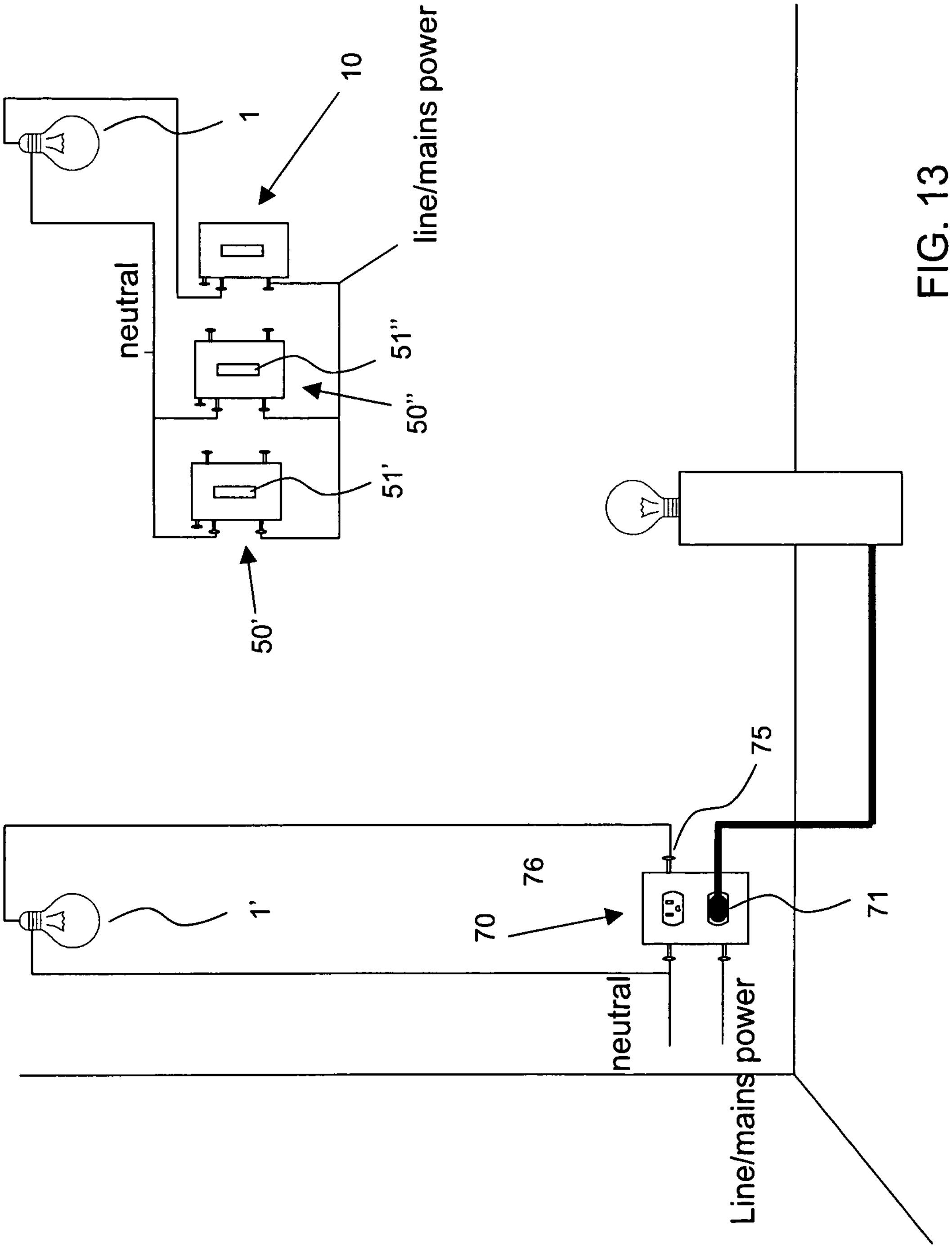
FIG. 13 is a view showing an exemplary wiring using electrical communication switches and an electrical communication outlet in the scenario depicted in FIG. 12.

FIG. 12 and FIG. 13 depict an additional wiring scenario. FIG. 12 is a view showing an exemplary wiring with a conventional electrical switch 10 and conventional electrical outlet 20. In FIG. 12, a conventional electrical switch 10 controls lighting fixture 1 and a conventional electrical outlet 20 is also located in the room. FIG. 13 is a view showing an exemplary wiring using electrical switches 50', 50" and an electrical outlet 70 in the scenario depicted in FIG. 12. If a homeowner would like to install an additional lighting fixture 1' and a socket 71 toggled by electrical switches, the homeowner can follow the wiring depicted in FIG. 13. First, additional electrical switches 50', 50" are installed adjacent the conventional electrical switch 10. A separate box may be used, or a new box allowing for three electrical switches may be installed. The conventional electrical switch 10 will continue to control the lighting fixture 1. The electrical switches 50', 50" will control the lighting fixture 1' and the socket 71 of the electrical outlet 70. Second, lighting fixture 1' may be wired to the electrical outlet 70 as described in relation to FIG. 6. Third, switch 51' of electrical switch 50' may be coordinated with controlled switch lead 75 by pairing or by instructing a central controller. Fourth, switch 51" of electrical switch 50" may be coordinated with socket 71 by pairing or by instructing a central controller. Consequently, toggling switch 51' of electrical switch 50' will turn lighting fixture 1' on and off, and toggling switch 51" of electrical switch 50" will turn socket 71 on and off.

The wiring example depicted in FIG. 13 demonstrates that switch controlled electrical outlets may be installed and used without providing wiring to the controlling electrical communication switches. Furthermore, the wiring example demonstrates that a single electrical outlet may be coordinated with more than one electrical switch. Although FIG. 13 depicts use of three electrical switches to control lighting fixtures 1, 1' and socket 71, one electrical switch could have been used having three switches/actuators (e.g., see FIG. 20).

Figure 14:
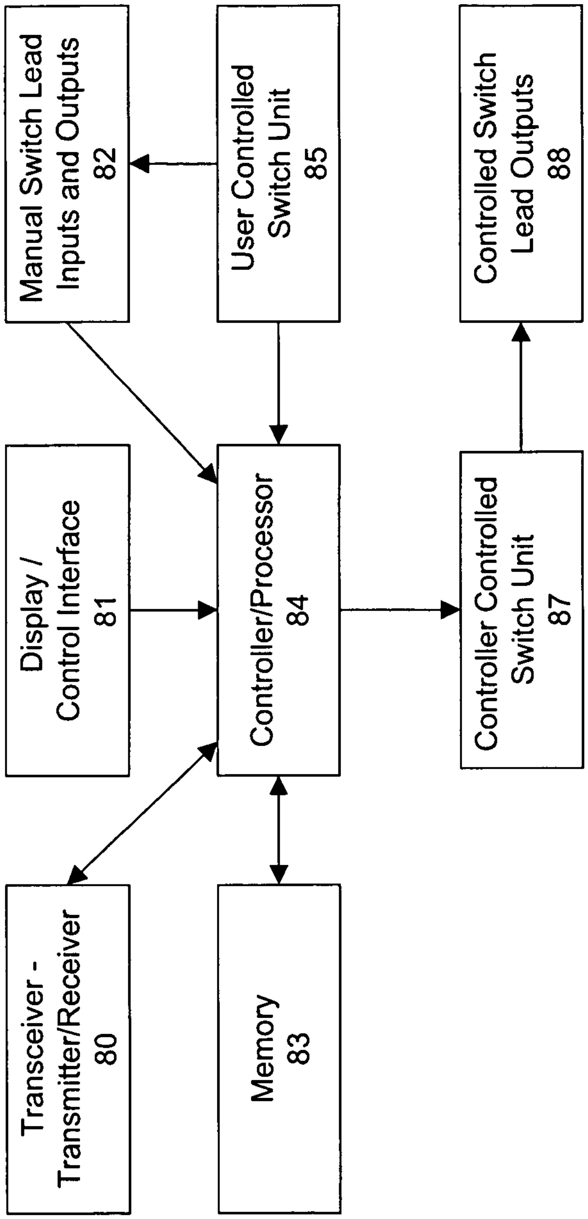
FIG. 14 is a component block diagram of an electrical communication switch according to an exemplary embodiment of the present invention.

FIG. 14 is a component block diagram of an electrical communication switch according to an exemplary embodiment of the present invention. The electrical communication switch may include a transceiver (transmitter/receiver) 80 (if communicates wirelessly), a display/control interface 81, manual switch lead inputs/outputs 82, memory 83, a controller/processor 84, a user controlled switch unit 85, a controller controlled switch unit 87, and controlled switch lead outputs 88. The transceiver 80 sends signals to and receives signals from other electrical switches and electrical outlets that operate wirelessly, or other wireless electrical devices (e.g., a computer if Bluetooth® wireless technology is used), and communicates with the controller/processor 84. The display/control interface 81 allows for turning on/off the communication components to save power, pairing with other devices, and/or user coordination with a central controller. The display/control interface 81 and controller/processor 84 communicate together.

For devices that communicate wirelessly, the memory 83 stores pairing information and may additionally store information as required by the controller/processor 84, including information relating to determining a particular state of the controlled switch lead outputs 88 under multi-way control and to restoring a particular state of the controlled switch lead outputs 88 upon a power failure. The memory 83 may include a battery so that memory is not lost when power to the electrical communication switch is cut, such as in a power failure. For devices that communicate via a central controller, the memory 83 stores identifier information and any other information needed for successful coordination with the central controller.

The manual switch lead inputs/outputs 82 are connected to the user controlled switch unit 85. The user controlled switch unit 85 may include a single pole single throw switch (SPST) (i.e., American two-way switch) as depicted in FIG. 7*a*, but may alternatively include other types of switches such as a single pole double throw switch (SPDT) (i.e., American three-way switch), double pole single throw (DPST), double pole double throw (DPDT), single pole changeover (SPCO), double pole changeover (DPCO), four-way switches, or any other switch currently known in the art. Thus, the user controlled switch unit 85 may contain any switch currently known in the art and any means to control that switch, whether such means include a single toggle switch, multiple toggle switches, potentiometer/lighting dimmer with variable resister control, push-button switches, lighted switches, or the like. The manual switch lead inputs/outputs 82 will have a corresponding number of lead inputs/outputs depending on the type of switch or switches included in the user controlled switch unit 85. Thus, for the American two-way SPST depicted in FIG. 7*a*, the manual switch lead inputs/outputs 82 would include one switch lead input and one switch lead output. For the American three-way SPDT, the manual switch lead inputs/outputs 82 would include one switch lead input and two switch lead outputs. And, for the American four-way, the manual switch lead inputs/outputs 82 would include two switch lead inputs and two switch lead outputs.

For a user controlled switch unit 85 that includes multi-way switches, the manual switch lead inputs/outputs 82 may not serve as a power lead for powering the communication functionality (i.e., the controller and other related components) of the electrical switch because the leads of multi-way switches may not always be connected to line/mains power. That is, for SPST switches, because there is typically a switch lead input connected to line/mains power, that switch lead input may normally power the communication functionality of the electrical communication switches. However, for multi-way switches, a separate power lead may be necessary to power the communication functionality of the electrical communication switches.

Conceivably, there may be uses for SPST switches in which the switch lead input is not connected to line/mains power (e.g., homeowner would like a light or a socket to turn on only when two separate switches are toggled). Therefore, electrical switches that include only an SPST switch may also provide a separate lead to power the communication functionality of the electrical communication switches.

The controller/processor 84 receives switch state information from the user controlled switch unit 85 and/or the manual switch lead inputs/outputs 82. From the user controlled switch unit 85, the controller/processor 84 may receive switch position state. The controller/processor 84 may alternatively receive switch position state from the manual switch lead inputs/outputs 82 by determining the resistance between the inputs and the outputs. When resistance is approximately zero between a manual switch lead input and a manual switch lead output, the two are connected together, which defines the state position of the switch. The switch position state may be discrete values or a range of values depending on the type of switches and controls included in the user controlled switch unit 85.

From the manual switch lead inputs/outputs 82, the controller/processor 84 receives voltage state information. The voltage state information may be used to determine which switch lead inputs and switch lead outputs are connected to line/mains power and which are not, and if they are connected, to what voltage they are connected. With information from the user controlled switch unit 85 and the manual switch lead inputs/outputs 82, the electrical switch may be setup to send signals as a function of switch position and/or the state of the manual switch leads. Whether the electrical switch sends signals in response to voltage state information or switch position state information depends on desired functionality. Accordingly, the display/control interface 81 may provide for allowing the homeowner to select that the electrical communication switch send signals in response to a switch position state and/or a voltage state of the manual switch leads. This is important with multi-way switching, as a switch position state may not necessarily indicate whether a connected device is on or off.

Figure 15:
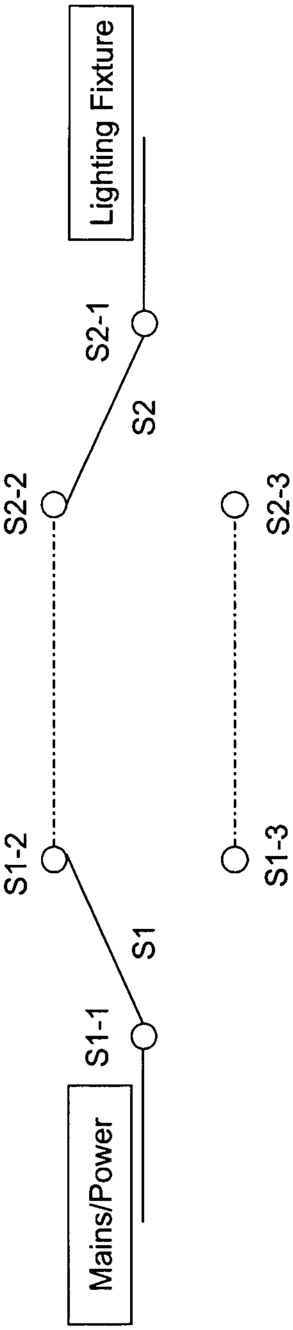
FIG. 15 is a diagram showing an exemplary three-way wiring.

If a homeowner selects that electrical switches send signals in response to the voltage state of the manual switch leads, the display/control interface 81 and/or central controller may provide for allowing a homeowner to link particular signals outputs with a particular voltage state of the manual switch leads. For example, assume two three-way electrical communication switches S1, S2 are configured as depicted in FIG. 15. The dotted lines between S1-2 and S2-2 and between S1-3 and S2-3 do not represent a connection, but rather how these switches would work together if connected conventionally. Assume also that a homeowner would like to control a socket in an electrical communication outlet (not shown) from the two three-way electrical switches S1, S2 such that the socket turns on when the lighting fixture is turned on and turns off when the lighting fixture is turned off. For this functionality to work, the homeowner must program S1 to notify S2 when S1-1 is toggled between S1-2 and S1-3 and must program S2 to notify the electrical communication outlet the voltage state of S2-1 whenever S2 receives a toggle notification from S1 and also whenever S2-1 is toggled between S2-2 and S2-3.

Figure 16:
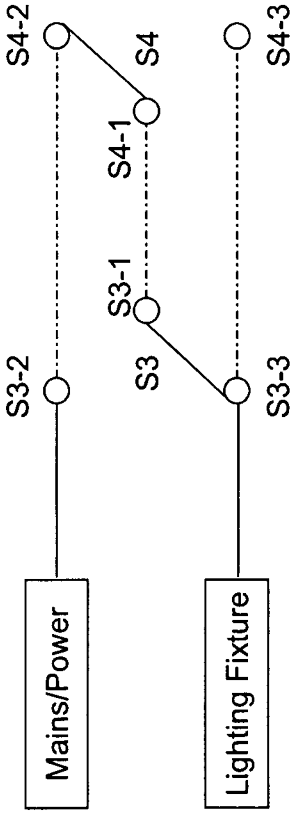
FIG. 16 is a diagram showing another exemplary three-way wiring.

FIG. 16 depicts another three-way configuration. As discussed above, the dotted lines do not indicate a connection, but rather how the switches should work together if connected conventionally. As depicted in FIG. 16, for the socket of the electrical communication outlet to be controlled by S3 and S4, S4 must be programmed to notify S3 whenever S4-1 is toggled between S4-2 and S4-3, and S3 must be programmed to transmit to the electrical communication outlet the voltage state of S3-3 whenever S3 receives a toggle notification from S4 and also whenever S3-1 is toggled between S3-2 and S3-3.

Figure 17:
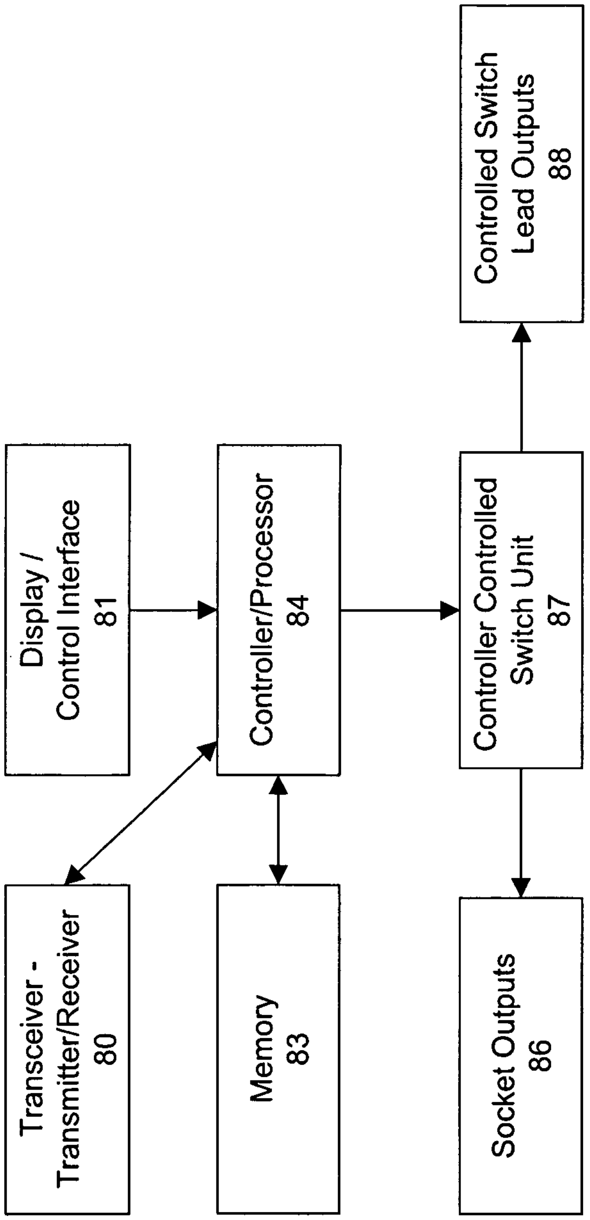
FIG. 17 is a component block diagram of an electrical communication outlet according to an exemplary embodiment of the present invention.

FIG. 17 is a component block diagram of an electrical communication outlet according to an exemplary embodiment of the present invention. An electrical communication outlet may include a transmitter/receiver 80 (wireless frameworks), display/control interface 81, memory 83, controller/processor 84, socket outputs 86, a controller controlled switch unit 87, and controlled switch lead outputs 88. Unlike the electrical communication switch, the electrical communication outlet includes socket outputs 86 and does not include manual switch lead inputs/outputs 82 and the user controlled switch unit 85. The socket outputs 86 may be controlled by the controller controlled switch unit 87.

Figure 18:
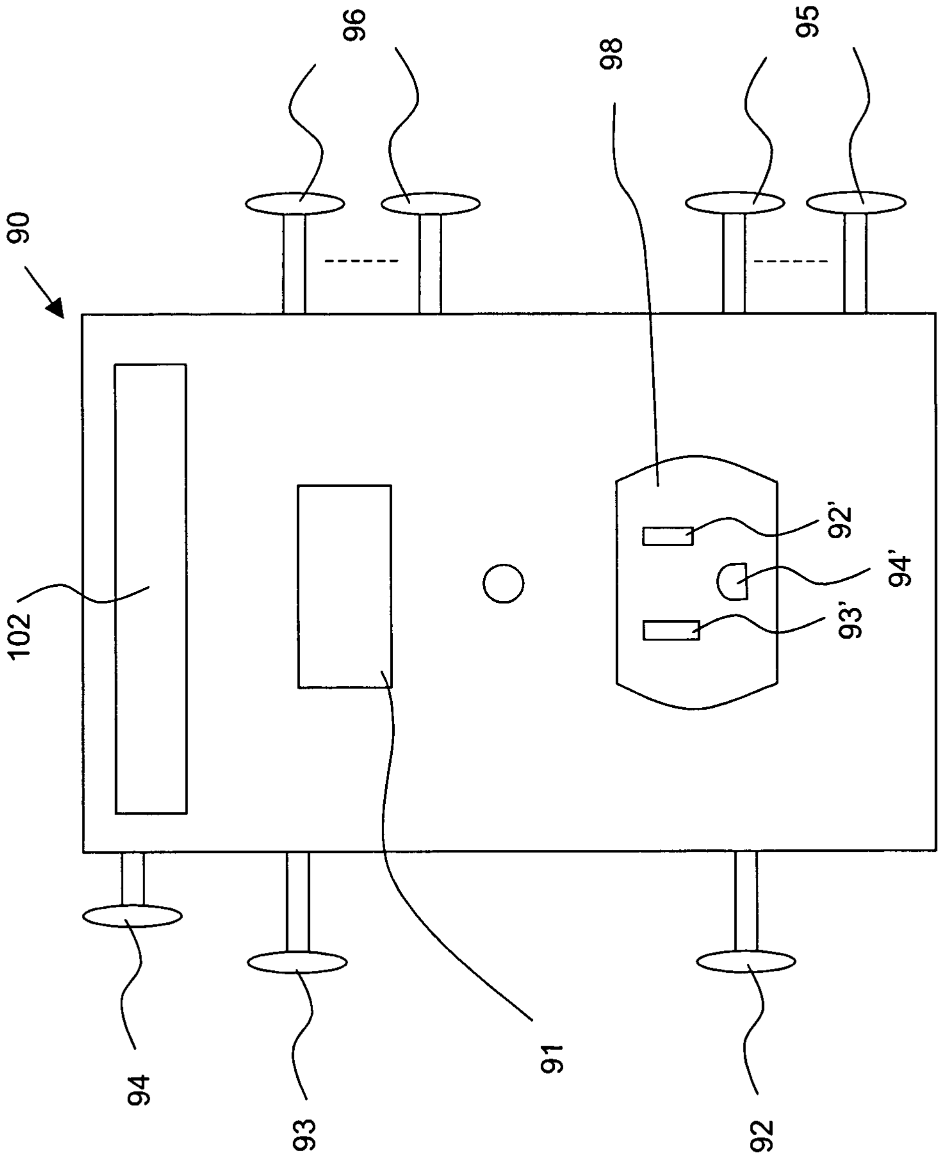
FIG. 18 is a view of an electrical communication switch and outlet according to an exemplary embodiment of the present invention.

FIG. 18 is a view of an electrical communication switch and outlet 90 according to an exemplary embodiment of the present invention. The electrical switch and outlet 90 includes switch 91, power lead 92, neutral lead 93, ground lead 94, manual switch leads 95, controlled switch leads 96, socket 98, and control interface 102. Power lead 91, neutral lead 93, and ground lead 94 are coupled to female socket slots 92', 93', and 94', respectively. The female sockets 92', 93', 94' are connected to and disconnected from leads 92, 93, and 94 by the controller controlled switch unit 87. The number of manual switch leads 95 corresponds with the type of switch implemented by switch 91 of the electrical switch 90. For example, if switch 91 is a two-way SPST switch, the manual switch leads 95 may contain one or two manual switch leads depending on whether power lead 92 is a manual switch lead input. If switch 91 is a three-way switch, the manual switch leads 95 may contain three manual switch leads. And, if switch 91 is a four-way switch, the manual switch leads 95 may contain four manual switch leads.

As can be appreciated by the disclosed embodiments of electrical communication switches, electrical communication outlets, and combo electrical communication switches/outlets, the electrical communication device may include any number of manual switches and sockets, and a corresponding number of manual switch leads depending on the number of switches and the types of switches used. Furthermore, the sockets may be of various types of sockets, including type A (North American/Japanese 2-pin), type B (American 3-pin), type C (European 2-pin), type D (Old British 3-pin), type E (French 2-pin/female earth), type F (German 2-pin/side clip earth), type E and F hybrid, type G (British 3-pin), type H (Israeli 3-pin), type I (Australian/New Zealand and Chinese/Argentinean 2/3-pin), type J (Swiss 3-pin), type K (Danish 3-pin), type L (Italian 3-pin), and type M (15A version of the Old British type D). Thus, the present invention is not limited by the type of socket or the number or types of switches.

Figure 19:
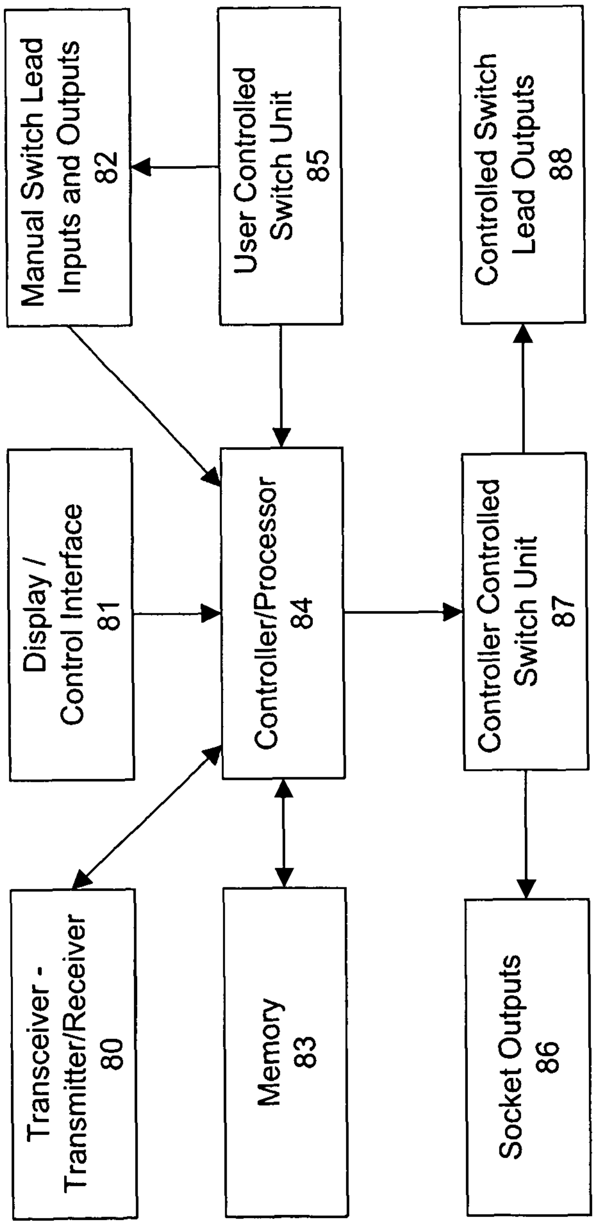
FIG. 19 is a component block diagram of an electrical communication switch and outlet according to an exemplary embodiment of the present invention.

FIG. 19 is a component block diagram of an electrical communication switch and outlet according to an exemplary embodiment of the present invention. The combo electrical switch/outlet 90 includes transceiver 80 (wireless framework), display/control interface 81, manual lead inputs/outputs 82, memory 83, controller/processor 84, user controlled switch unit 85, socket outputs 86, controller controlled switch unit 87, and controlled switch lead outputs 88.

Figure 20:
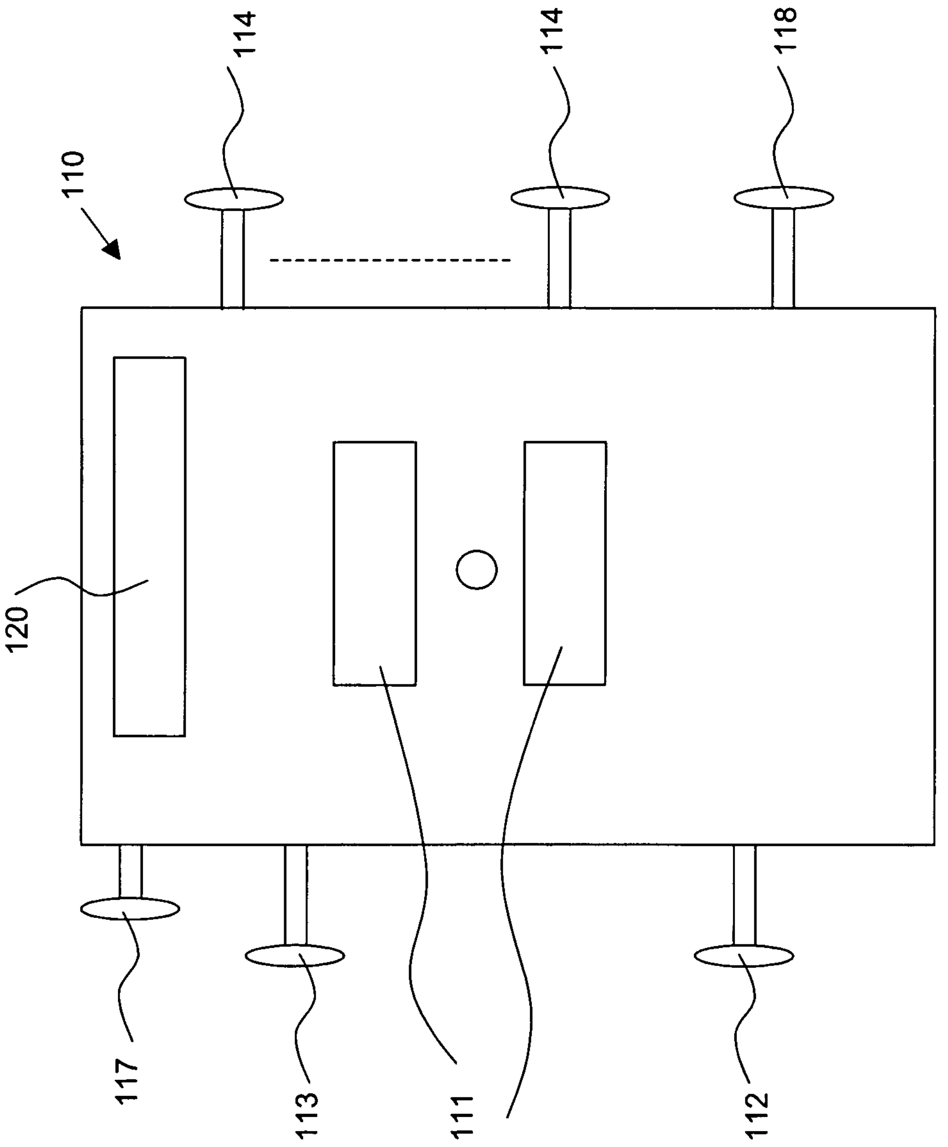
FIG. 20 is a view of a multi-switch electrical communication switch according to an exemplary embodiment of the present invention.

FIG. 20 is a view of a multi-switch electrical communication switch 110 according to an exemplary embodiment of the present invention. The multi-switch electrical switch 110 includes switches 111, power lead 112, neutral lead 113, ground lead 117, manual switch leads 114, controlled switch lead 118, and display/control interface 120. The manual switch leads 114 correspond to the number and types of switches 111 included in the multi-switch electrical switch 110. For example, if the multi-switch electrical switch 110 includes one three-way SPDT switch and one two-way SPST switch, the multi-switch electrical switch 110 may include four or five manual switch leads 114, one or two for the SPST switch and three for the SPDT switch. If power lead 112 is not used as a manual switch lead input, then the multi-switch electrical switch 110 would include five manual switch leads 114.

Use of multi-way electrical switches are necessary for allowing multi-way conventional electrical switches to be replaced with electrical communication switches while continuing to provide manual switch functionality (i.e., the same function as the conventional electrical switches they replace without use of the controller). However, in situations in which a homeowner does not want to preserve manual switch functionality or, for example, would like to convert a two-way conventional electrical switch such that it has three-way functionality, multiple two-way electrical switches may be used.

Figure 21:
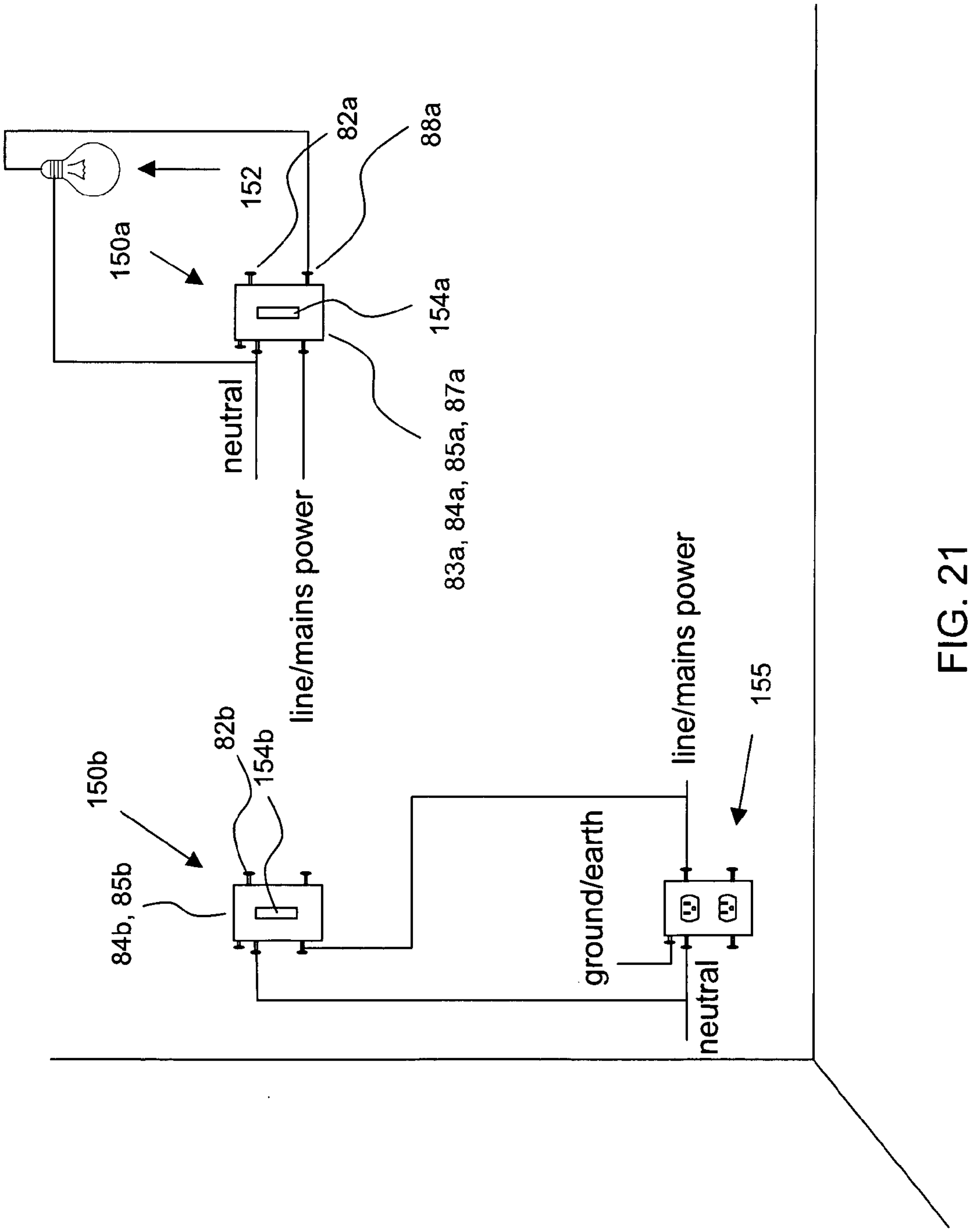
FIG. 21 is a view showing exemplary three-way functionality using two-way electrical communication switches according to an exemplary embodiment of the present invention.

FIG. 21 is a view showing exemplary three-way functionality using two-way electrical communication switches 150*a*, 150*b* according to an exemplary embodiment of the present invention. For example, assume that a two-way conventional electrical switch controls lighting fixture 152. In order to control lighting fixture 152 from an additional electrical switch, an electrical switch 150*a* may be installed to replace the conventional electrical switch and an electrical switch 150*b* may be installed and wired to the closest power source, which in FIG. 21 us depicted as electrical outlet 155. Next, switches 154*a*, 154*b* may be coordinated/paired to control the controlled switch lead 153*a*. Once coordinated/paired, the two two-way electrical switches 150*a*, 150*b* will operate to provide three-way functionality to control the lighting fixture 152.

When switch 154*b* of the electrical switch 150*b* is toggled (e.g., switched on or off) or adjusted (e.g., dimmer potentiometer adjusted), its controller/processor 84*b* will receive a signal from the user controlled switch unit 85*b* and/or the manual switch lead inputs/outputs 82*b* that switch 154*b* was toggled/adjusted. The controller/processor 84*b* will determine in what position the switch 154*b* was toggled/adjusted and will send out a signal indicating that switch 154*b* was toggled/adjusted. The controller/processor 84*a* of the electrical switch 150*a* will receive the signal directly or a corresponding signal from a central controller and will coordinate its controlled switch lead outputs 88*a* to control the lighting fixture 152.

When switch 154*a* of the electrical switch 150*a* is toggled or adjusted, its controller/processor 84*a* will receive a signal from the user controlled switch unit 85*a* and/or the manual switch lead inputs/outputs 82*a* that switch 154*a* was toggled/adjusted. The controller/processor 84*a* will determine in what position switch 154*a* was toggled/adjusted. If the electrical switches 150*a*, 150*b* communicate through a central controller, the controller/processor 84*a* of switch 154*a* will send out a signal indicating that switch 154*a* was toggled/adjusted. The central controller will process the information to determine a particular action order to transmit depending on the state of the switches 154*a*, 154*b*. The controller/processor 84*a* will receive a corresponding signal (i.e., action order) from the central controller and will coordinate its controlled switch lead outputs 88*a* to control the lighting fixture 152. If the electrical switches 150*a*, 150 communicate wirelessly, the controller 84*a* stores all state information into memory 83*a*, addresses memory to determine the particular state of the controlled switch lead outputs 88*a*, and requests the controller controlled switch unit 87*a* to switch and/or to adjust the signal to the controlled switch lead outputs 88*a* accordingly.

Figure 22:
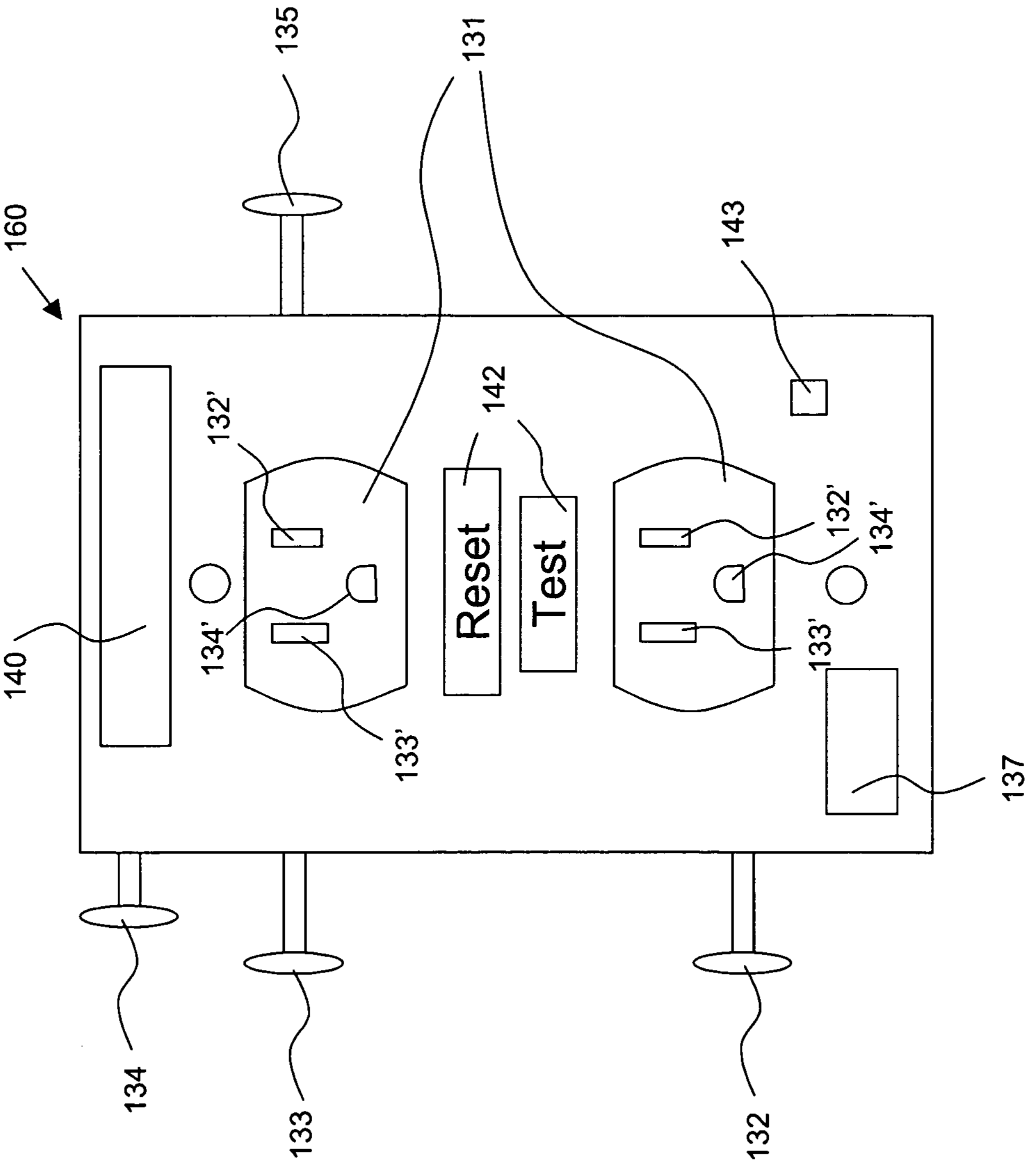
FIG. 22 is a view of an electrical communication outlet with a ground fault circuit interrupter according to an exemplary embodiment of the present invention.

FIG. 22 is a view of an electrical communication outlet 160 with a ground fault circuit interrupter (GFCI) according to an exemplary embodiment of the present invention. The electrical communication outlet 160 includes a GFCI and corresponding "reset" and "test" buttons. A GFCI is also known as an appliance leakage current interrupter (ALCI), a residual current device (RCD), or a residual current circuit breaker (RCCB). A GFCI detects leakage current and breaks the circuit connection if the leakage current is above a predetermined value. The electrical communication outlet 160 may additionally include a light 143, which is lighted when the sockets 131 are operational (i.e., after pushing the reset button).

Figure 23:
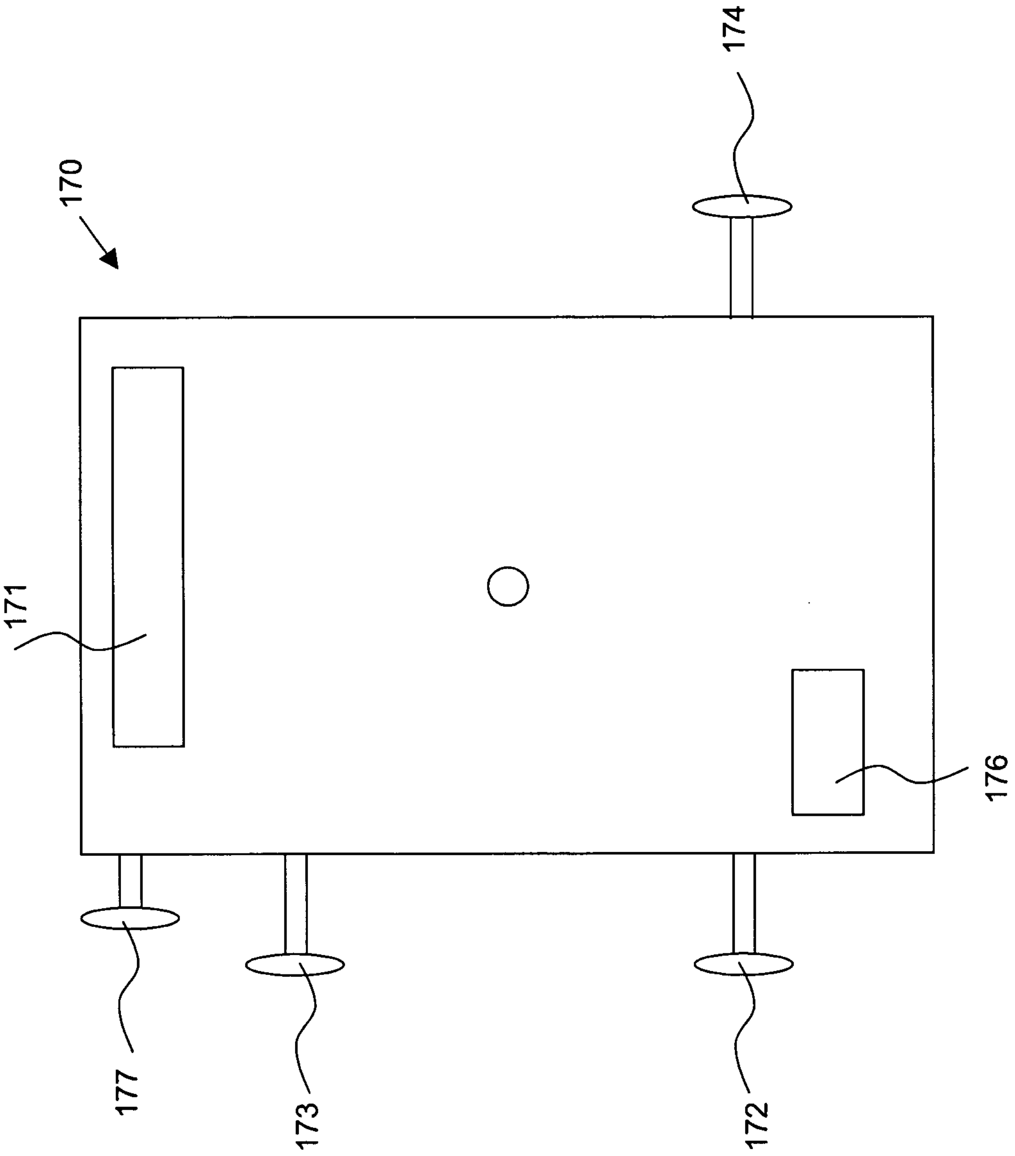
FIG. 23 is a view of an electrical communication switch/outlet companion device according to an exemplary embodiment of the present invention.

FIG. 23 is a view of an electrical communication switch/outlet companion device 170 according to an exemplary embodiment of the present invention. The electrical switch/outlet companion device may include display/control interface 171, power lead 172, neutral lead 173, controlled switch lead 174, and ground lead 177. If the electrical switch/outlet companion device 170 communicates wirelessly (rather than through a central controller), the device 170 may further include transceiver antenna 176. The electrical switch/outlet companion device 170 does not include sockets or switches, as the device may be used in situations in which a switch or outlet is not needed. Such an example was illustrated in FIG. 11. Referring to FIG. 11, the electrical switch 50*b* receives signals from the electrical switch 50*a* in order to control lighting fixture 1*b*. However, the switch 51*b* is non-functional, as the switch 51*b* is not coordinated/paired with any other device. In such a situation, the electrical switch/outlet companion device 170 would be suitable, as a homeowner could cover the device 170 with a blank faceplate/cover and therefore avoiding having non-functional user-controlled switches.

In an alternative embodiment, switch 51*b* is removable, which would allow a blank faceplate/cover to be installed over the electrical switch 50*b* when switch 51*b* is not used. In such an embodiment, the switch 51*b* may have a snap fit or some other mechanical apparatus of attaching and detaching from the body of the electrical switch 50*b*.

The disclosed electrical communication switches, electrical communication outlets, and electrical communication companion devices allow a homeowner to utilize existing wiring and reduce the required wiring and hence wiring labor costs when remodeling. The electrical communication switches, electrical communication outlets, and electrical communication companion devices may further provide for easily interfacing with the devices by computer or remotely by the Internet. In an exemplary embodiment, the electrical communication devices include transceivers for communicating wirelessly and/or an Ethernet port (such as RJ45 Ethernet port) for allowing a user to connect directly to the devices in order to setup control of the electrical communication devices or to control the state of the electrical communication devices. Alternatively, the central controller includes a transceiver and/or an Ethernet port for allowing a user to connect directly to the central controller in order to setup functionality of the electrical communication devices or to control the state of the electrical communication devices.

In an alternative embodiment, the electrical communication devices and/or central controller may include a Universal Serial Bus (USB) port or some other type of port for allowing handheld devices or portable laptop computers to connect by plugging into the port. Such a handheld device could be used by electricians and/or homeowners to control the functionality of the electrical communication devices in the household.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. An electrical switch comprising:

a user-controlled switch having a plurality of switch leads, one of the switch leads being a user-controlled switch lead output;

a controlled switch having a controlled switch lead output; and a controller coupled to the user-controlled switch and the controlled switch, wherein the controller is configured to determine a change of state of the user-controlled switch, and upon determining the user-controlled switch has changed state to a new state, to send a first signal to a first device external to the electrical switch, wherein the controller is configured to receive a second signal independent of the user-controlled switch from a second device external to the electrical switch and to change a state of the controlled switch pursuant to the received signal, the state of the controlled switch affecting a voltage on the controlled switch lead output, the controlled switch being independent of the user-controlled switch such that the user-controlled switch affects the user-controlled switch lead output without affecting the controlled switch lead output and the controlled switch affects the controlled switch lead output without affecting the user-controlled switch lead output.

2. The electrical switch of claim 1, wherein the signal includes information identifying the electrical switch and the new state.

3. The electrical switch of claim 2, wherein the controller is coupled to the plurality of switch leads and is configured to determine the change of state of the user-controlled switch by determining a change in a voltage from a first voltage to a second voltage on at least one of the plurality of switch leads, the information identifying the new state being information identifying the second voltage.

4. The electrical switch of claim 2, wherein the controller is configured to determine the change of state of the user-controlled switch by determining a change in switch position from a first position to a second position of the user-controlled switch, the information identifying the new state being information identifying the second position.

5. The electrical switch of claim 1, further comprising:

a transceiver coupled to the controller for transmitting the signal;

an antenna coupled to the transceiver;

a memory coupled to the controller; and a control interface coupled to the controller for allowing a user to turn on and to turn off the transceiver and the controller, wherein the controller is configured to send the signal wirelessly through the transceiver and the antenna to other electrical devices, the signal being an electromagnetic signal.

6. The electrical switch of claim 5, wherein the user-controlled switch includes a switch control device for allowing a user to control a state of the user-controlled switch, the antenna being located in the switch control device.

7. The electrical switch of claim 1, wherein the user-controlled switch includes a switch control device for allowing a user to control a state of the user-controlled switch, the switch control device being removable from the user-controlled switch such that a faceplate can be installed that entirely covers the electrical switch.

8. The electrical switch of claim 1, wherein the controller is coupled to a signal/power line and is configured to send the signal to a central controller via the signal/power line.

9. The electrical switch of claim 1, further comprising:

a neutral lead and a power lead coupled to the controller, the power lead being one of the plurality of switch leads or a separate lead;

a ground lead coupled to a body of the electrical switch; and a hole for allowing a faceplate to attach to the body of the electrical switch.

10. An electrical switch comprising:

a body;

a user-controlled switch on the body having a plurality of switch leads, the plurality of switch leads being accessible on the body for attaching wires;

a controller attached to the body; and a controlled switch attached to the body and coupled to a controlled switch output accessible on the body for attaching a wire, the controlled switch output being different than any of the plurality of switch leads, wherein the controller is configured to receive a second signal independent of the user-controlled switch and to change a state of the controlled switch pursuant to the received signal, the state of the controlled switch affecting a voltage on the controlled switch output without affecting a voltage on any of the plurality of switch leads, wherein the controller is configured to determine directly a change of state of the user-controlled switch, and upon determining the user-controlled switch has changed state to a new state, to send a signal.

11. The electrical switch of claim 10, wherein the controller is configured to determine a change of state of the user-controlled switch independent of an electrical path between the switch leads and any electrical device controlled by the user-controlled switch.

12. The electrical switch of claim 10, wherein the body is configured to be installed within an electrical box within a wall and the controlled switch output is configured to be attached to a wire extending to the electrical box within the wall.

13. The electrical switch of claim 10, wherein the signal includes information based on the state of the user-controlled switch.

14. The electrical switch of claim 10, wherein the signal is sent to a second electrical switch and contains information to control a controlled switch of the second electrical switch.

15. The electrical switch of claim 10, wherein the signal is sent to an electrical outlet and contains information to control a controlled switch of the electrical outlet that is coupled to a socket of the electrical outlet.

16. The electrical switch of claim 10, wherein the signal is sent to an electrical outlet and contains information to control a controlled switch of the electrical outlet that is decoupled to a socket of the electrical outlet.

17. The electrical switch of claim 10, wherein the signal is sent to a controller to be routed to a second electrical switch and the signal contains information to control a controlled switch of the second electrical switch.

18. The electrical switch of claim 10, wherein the signal is sent to controller to be routed to an electrical outlet and the signal contains information to control a controlled switch of the electrical outlet that is coupled to a socket of the electrical outlet.

19. The electrical switch of claim 10, wherein the signal is sent to a controller to be routed to an electrical outlet and the signal contains information to control a controlled switch of the electrical outlet that is decoupled to a socket of the electrical outlet.

20. The electrical switch of claim 10, wherein the signal includes information identifying the electrical switch and the new state.

21. The electrical switch of claim 10, wherein the controller is connected to the plurality of switch leads and is configured to determine the change of state of the user-controlled switch by determining a change in a voltage from a first voltage to a second voltage on at least one of the plurality of switch leads.

22. The electrical switch of claim 21, wherein the signal includes information based on the second voltage.

23. The electrical switch of claim 10, wherein the controller is coupled to the user-controlled switch and is configured to determine the change of state of the user-controlled switch by determining a change in switch position from a first position to a second position of the user-controlled switch.

24. The electrical switch of claim 23, wherein the signal includes information based on the second position.

25. The electrical switch of claim 10, further comprising:

a transceiver coupled to the controller for transmitting the signal;

an antenna coupled to the transceiver; and a memory coupled to the controller, wherein the controller is configured to send the signal wirelessly through the transceiver and the antenna to other electrical devices.

26. The electrical switch of claim 25, further comprising a control interface coupled to the controller for allowing a user to turn on and to turn off at least one of the transceiver and the controller.

27. The electrical switch of claim 10, wherein the user-controlled switch includes a switch control device for allowing a user to control a state of the user-controlled switch.

28. The electrical switch of claim 27, further comprising an antenna located in the switch control device.

29. The electrical switch of claim 27, wherein the switch control device is removable from the user-controlled switch.

30. The electrical switch of claim 29, wherein the body includes a hole for attaching a blank faceplate upon detaching the switch control device.

31. The electrical switch of claim 10, wherein the body includes a hole for attaching a faceplate in order to hide the body within a wall.

32. The electrical switch of claim 10, further comprising a signal/power line accessible on the body, wherein the controller is coupled to the signal/power line and is configured to send the signal to a central controller via the signal/power line.

33. The electrical switch of claim 10, further comprising a neutral lead accessible on the body, wherein the neutral lead is coupled to the controller.

34. The electrical switch of claim 10, wherein the controller is within the body.

35. The electrical switch of claim 10, wherein the controller is directly attached to the user-controlled switch.

36. A method of controlling an electrical switch, comprising:

receiving a signal independent of a user-controlled switch of the electrical switch;

controlling a state of a controlled switch of the electrical switch based on the received signal;

controlling a state of a user-controlled switch lead output coupled to the user-controlled switch based on a state of the user-controlled switch without affecting a state of a controlled switch lead output coupled to the controlled switch; and controlling a state of the controlled switch lead output coupled to the controlled switch based on the received signal without affecting the state of the user-controlled switch lead output coupled to the user-controlled switch.

37. The method of claim 36, further comprising:

determining the user-controlled switch of the electrical switch has changed state; and sending a second signal based on the state of the user-controlled switch.

38. The method of claim 36, wherein the electrical switch houses the user-controlled switch, the controlled switch, the user-controlled switch lead output, and the controlled switch lead output within a same housing.

39. An electrical switch, comprising:

means for receiving a signal independent of a user-controlled switch of the electrical switch;

means for controlling a state of a controlled switch of the electrical switch based on the received signal;

means for controlling a state of a user-controlled switch lead output coupled to the user-controlled switch based on a state of the user-controlled switch without affecting a state of a controlled switch lead output coupled to the controlled switch; and means for controlling a state of the controlled switch lead output coupled to the controlled switch based on the received signal without affecting the state of the user-controlled switch lead output coupled to the user-controlled switch.

40. The electrical switch of claim 39, wherein the electrical switch houses the user-controlled switch, the controlled switch, the user-controlled switch lead output, and the controlled switch lead output within a same housing.

* * * * *